(12) United States Patent
Miyoshi et al.

(10) Patent No.: US 7,128,004 B2
(45) Date of Patent: Oct. 31, 2006

(54) SUPPLYING APPARATUS FOR SUPPLYING COMBUSTIBLE MATERIAL, A GASIFICATION APPARATUS FOR GASIFYING COMBUSTIBLE MATERIAL AND METHOD FOR GASIFYING COMBUSTIBLE MATERIAL

(75) Inventors: Norihisa Miyoshi, Tokyo (JP); Tatsuya Hasegawa, Tokyo (JP); Katsutoshi Naruse, Tokyo (JP); Yasuhiro Sawada, Tokyo (JP); Koh Sasaki, Tokyo (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 10/835,071

(22) Filed: Apr. 30, 2004

(65) Prior Publication Data

US 2004/0237860 A1   Dec. 2, 2004

(30) Foreign Application Priority Data

Apr. 30, 2003   (JP)   .............................. 2003-125695

(51) Int. Cl.
*F23K 3/00* (2006.01)
(52) U.S. Cl. ................... 110/101 R; 110/108; 110/110; 110/292; 110/245
(58) Field of Classification Search ............ 110/101 R, 110/102, 105, 108, 110, 243, 244, 245, 229, 110/224, 228, 292, 297
See application file for complete search history.

(56) References Cited

U.S. PATENT DOCUMENTS 3,397,657 A * 8/1968 Tada ........................... 110/245
4,454,828 A * 6/1984 Zempel ........................ 110/248
4,836,116 A * 6/1989 MacKay et al. ............. 110/245
5,279,234 A * 1/1994 Bender et al. ............... 110/210

FOREIGN PATENT DOCUMENTS

| JP | 62255719 A | * 11/1987 |
| JP | 0204415 | * 8/1988 |
| JP | 402044115 | * 8/1988 |
| JP | 7-332614 | 12/1995 |
| JP | 2001-221419 | 8/2001 |
| JP | 2002-168424 | 6/2002 |

* cited by examiner

*Primary Examiner*—Kenneth Rinehart
(74) *Attorney, Agent, or Firm*—Wenderoth, Lind & Ponack, L.L.P.

(57) ABSTRACT

A supplying apparatus supplies a combustible material capable of enhancing the sealing effects of a supplying system for supplying a combustible material, such as combustible wastes, to a fluidized-bed chamber, stably supplies a combustible material having an undefined shape, and reduces cost for installation. A facility is also provided for gasifying a combustible material using the supplying apparatus for supplying a combustible material, and a method of gasifying combustible materials is also provided. The supplying apparatus supplies a combustible material onto the fluidized bed of a fluidized-bed gasifier chamber or a fluidized-bed combustion chamber. A screw conveyor is inclined, with transportation of the combustible material directed upward, at an angle of 20 degrees or more and 80 degrees or less with respect to a horizontal plane, causing a bed material to flow into a conveyor casing of the screw conveyor.

17 Claims, 15 Drawing Sheets

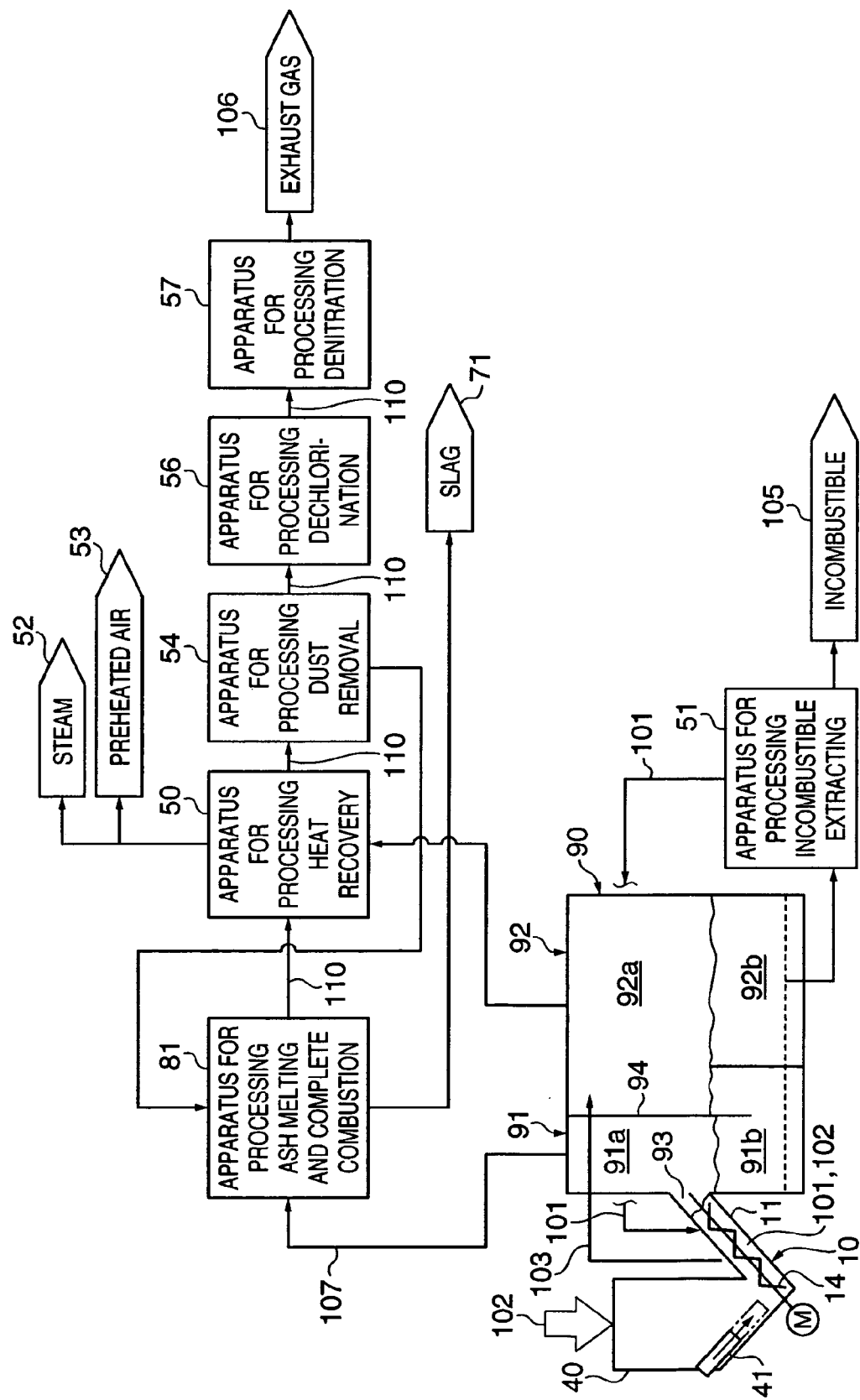

400
SUPPLYING APPARATUS FOR SUPPLYING COMBUSTIBLE MATERIAL, A GASIFICATION APPARATUS FOR GASIFYING COMBUSTIBLE MATERIAL AND METHOD FOR GASIFYING COMBUSTIBLE MATERIAL

BACKGROUND OF THE INVENTION

1. Field of the Invention

The invention relates to a supplying apparatus for supplying a combustible material to a fluidized-bed gasifier chamber or a fluidized-bed combustion chamber, a gasification apparatus for gasifying a combustible material and a method for gasifying combustible materials in a fluidized-bed gasifier chamber or a fluidized-bed combustion chamber for use in a facility for gasifying or incinerating combustible materials such as municipal wastes, industrial wastes, waste plastic, biomass (thinned plants, wood chips, construction scrap wood, sludge, etc.), coal, RDF, wastes of high water contents, and the like.

2. Description of the Related Art

In recent years, a gasification and slagging combustion method has been employed as a treatment method of combustible wastes such as various wastes. In the gasification and slagging combustion method, combustible wastes are pyrolyzed and gasified. If the amount of oxygen supplied is larger than a required amount of oxygen, then the combustible wastes are excessively combusted to increase the temperature of a furnace. In such a case, stable operation may be inhibited. Thus, it has been desired to strictly manage the amount of air to be supplied.

However, a treatment system of combustible wastes is generally operated at a pressure lower than an atmospheric pressure in many cases in order to prevent ejection of a gas. Accordingly, the treatment system is problematic in that the system cannot sufficiently prevent leakage of air from a waste supplying system, which supplies combustible wastes into a furnace. Although a mechanical device such as a sealing valve has been used to prevent leakage of air, such a mechanical device has problems such as engagement into a sealing portion and generation of a bridge at a sealing portion because of undefined shapes of wastes. Thus, it has practically been difficult to provide a sealing system to achieve stable operation.

As described above, it has been attempted in recent years to gasify combustible wastes into a generated gas without complete combustion, then purify the generated gas, and utilize the purified gas as a raw material. In such a case, if unnecessary air flows into the generated gas, then the quality of the generated gas is degraded. Therefore, a system which can stably supply combustible wastes having undefined shapes and minimize leakage of air has been desired.

This invention has been made in view of the problems described above. It is therefore an object of the invention to provide: a combustible material supplying apparatus capable of enhancing the sealing effects of a supplying system for supplying a combustible material, such as combustible wastes, to a fluidized-bed chamber, stably supplying a combustible material having an undefined shape, and reducing costs for installation; and further to provide a facility for gasifying a combustible material using the combustible material supplying apparatus; and further to provide a method of gasifying combustible materials.

SUMMARY OF THE INVENTION

In order to achieve the above object, as shown in FIG. 1 for example, an aspect of the present invention is a supplying apparatus 10 for supplying a combustible material 102 to an upper portion of a fluidized bed 23 of a fluidized-bed gasifier chamber or a fluidized-bed combustion chamber (i.e., a fluidized-bed chamber) 20. The apparatus includes a hopper configured to store a combustible material 102, and a mechanical supplying apparatus configured to supply a combustible material 102 from the hopper to the fluidized-bed gasifier chamber or the fluidized-bed combustion chamber 20 through a flow passage of the combustible material with a flow line directed upward, inclined at an angle of 20 degrees or more and 80 degrees or less with respect to a horizontal plane.

Since, as described above, the supplying apparatus for supplying a combustible material comprises a mechanical supplying apparatus configured to supply a combustible material from the hopper to the fluidized-bed gasifier chamber or the fluidized-bed combustion chamber through a flow passage of the combustible material with a flow line directed upward, inclined at an angle of 20 degrees or more and 80 degrees or less with respect to a horizontal plane, the position where the combustible material is supplied can be lowered. For example, the height of a building in which the facility with the supplying apparatus for supplying a combustible material is installed can be reduced by a lowered position of the material supplying means such as a waste crane.

In one aspect of the present invention, as shown in FIG. 1 for example, the mechanical supplying apparatus comprises a conveyor 10 having a rotating helical vane 13 configured to supply combustible material 102 by means of a rotational action of the rotating helical vane 13.

Since, as described above, the mechanical supplying apparatus is a so called screw conveyor or a spiral conveyor in which a helical vane is rotated, a combustible material is forced upward and supplied. As a result, it is possible to achieve high material sealing effects especially by filling the conveyor casing with a bed material to promote crushing of a raw material, which prevents both the leakage of air into the chamber and the leak of a gas out of the chamber.

In another aspect of the present invention, as shown in FIG. 6 for example, the conveyor 10 has a plurality of helical vanes 13 disposed generally in parallel.

Since, as described above, the conveyor has two or more helical vanes disposed generally in parallel, crushing of a raw material is promoted especially by filling the conveyor casing with a bed material.

In another aspect of the present invention, as shown in FIG. 3 for example, a conveyor casing 11 is provided to contain the helical vane 13. The conveyor casing 13 has a projection 111 on the inner surface of the conveyor casing 11, and the projection is configured to maintain the efficiency of transportation.

In such a configuration, the combustible material does not rotate together with the rotating helical vanes. The combustible material therefore does not remain in a position and is securely forced upward.

In another aspect of the present invention, as shown in FIG. 1 for example, the supplying apparatus 10 for supplying a combustible material further comprises a medium supplying apparatus configured to supply medium 101 to the mechanical supplying apparatus, and the inside of the mechanical supplying apparatus is stuffed with the medium 101 to prevent gas communication therein.

In such a configuration, a medium for preventing gas communication fills the medium supplying apparatus. It is therefore possible to promote crushing of a raw material, suppressing of the variation of the amount of a combustible material to be supplied, and achievement of high material sealing effects.

In another aspect of the present invention, as shown in FIG. 4 for example, the medium supplying apparatus further comprises a flow passage 16 of medium 101 not being identical to (different from) the flow passage of combustible material 102.

In such a configuration, the medium is securely supplied to the mechanical supplying apparatus through the flow passage of the medium to fill it with the medium.

In another aspect of the present invention, as shown in FIG. 8 for example, a gasification apparatus for gasifying a combustible material 102 comprises a supplying apparatus 10 for supplying a combustible material and a fluidized-bed gasifier chamber 30 supplied with a combustible material 102 from the supplying apparatus 10 for supplying a combustible material.

Since, as described above, the supplying apparatus for supplying a combustible material is a mechanical supplying apparatus configured to supply a combustible material from the hopper to the fluidized-bed gasifier chamber or the fluidized-bed combustion chamber through a flow passage of the combustible material with a flow line directed upward, inclined at an angle of 20 degrees or more and 80 degrees or less with respect to a horizontal plane, the height of a building in which the gasification apparatus for gasifying a combustible material is installed can be reduced.

In another aspect of the present invention, as shown in FIG. 9 for example, the gasification apparatus for gasifying a combustible material 102 comprises a supplying apparatus 10 for supplying a combustible material 102, a fluidized-bed gasifier chamber 60 configured to gasify combustible material 102 supplied by supplying apparatus 10 for supplying a combustible material, and a bypass line configured to bypass gasifier chamber 60 to lead a gas 103 generated from the combustible material 102 in supplying apparatus 10 for supplying a combustible material.

Since, as described above, there is provided a bypass line which bypasses the gasifier chamber to lead a gas generated from the combustible material in the supplying apparatus for supplying a combustible material, to the downstream of the gasifier chamber, it is possible to suppress the variation of the amount of the gas generated in the gasifier chamber and also possible to securely treat the gas generated in the supplying apparatus for supplying a combustible material with no leakage of the gas outside.

In another aspect of the present invention, as shown in FIG. 8 for example, the gasification apparatus for gasifying a combustible material comprises a supplying apparatus 10 for supplying a combustible material 102, and a fluidized-bed gasifier chamber 30 configured to gasify combustible material 102 supplied by supplying apparatus 10 for supplying a combustible material 102. At least one of moisture and volatile matter is vaporized from the combustible material 102 within supplying apparatus 10 for supplying a combustible material 102.

Since, as described above, moisture and volatile matter is vaporized from the combustible material within the supplying apparatus for supplying a combustible material, and then the combustible material from which the moisture and volatile matter was vaporized is supplied to the fluidized-bed gasifier chamber, it is possible to suppress the variation of the amount of the gas generated in the gasifier chamber and also to suppress the variation of the moisture therein.

In one aspect of the present invention, as shown in FIG. 9 for example, the gasification apparatus for gasifying a combustible material further comprises a bypass line configured to bypass gasifier chamber 60 to lead at least one of moisture and volatile matter 103 vaporized in supplying apparatus 10 for supplying a combustible material 102, to the downstream of gasifier chamber 60.

Since, as described above, the moisture and volatile matter vaporized in supplying apparatus for supplying a combustible material bypasses the fluidized-bed gasifier chamber and is led to the downstream of the fluidized-bed gasifier chamber, it is possible to securely treat the gas generated in the supplying apparatus for supplying a combustible material with no leakage of the gas outside.

In another aspect of the present invention, as shown in FIG. 9 for example, a method for gasifying a combustible material 102 in a fluidized-bed gasifier chamber or a fluidized-bed combustion chamber 60, comprises the steps of storing combustible material 102 in a hopper 40, supplying combustible material 102 upwardly from hopper 40 to fluidized-bed gasifier chamber or the fluidized-bed combustion chamber 60 by a mechanical supplying apparatus, to enhance a material sealing function of the apparatus by filling an inside with medium 101 which constitutes a fluidized-bed 62, and gasifying combustible material 102 supplied to fluidized-bed gasifier chamber or said fluidized bed combustion chamber 60 by the mechanical supplying apparatus.

Since, as described above, the combustible material is supplied upwardly by the mechanical supplying apparatus and then a bed material is filled in the mechanical supplying apparatus, it is possible to promote crushing of the combustible material and suppress the variation of the amount of the combustible material to be supplied. Furthermore, the combustible material can be gasified while achieving high material sealing effects.

Another aspect of the present invention is, as shown in FIG. 1 for example, a supplying apparatus 10 for supplying a combustible material 102 to a fluidized-bed gasifier chamber or a fluidized-bed combustion chamber 20 comprises a hopper configured to store a combustible material 102, and a mechanical supplying apparatus configured to supply a combustible material 102 from the hopper to the fluidized-bed gasifier chamber or the fluidized-bed combustion chamber 20 through a flow passage of the combustible material with a flow line directed upward, wherein combustible material 102 is supplied together with a medium 101 to prevent gas communication through mechanical supplying apparatus.

Since, as described above, the combustible material is supplied together with a medium to prevent gas communication by supplying apparatus 10 for supplying a combustible material with a flow line directed upward, a mixture of the combustible material and the medium to prevent gas communication is transported, resulting in a supplying apparatus for supplying a combustible material having high material sealing effects.

BRIEF DESCRIPTION OF THE DRAWINGS

FIG. 13 is a schematic view, showing an example of an advanced gasification and slagging combustion facility having a supplying apparatus for supplying a combustible material according to the invention.

DETAILED DESCRIPTION OF THE PREFERRED EMBODIMENTS

The above and other objects, features, and advantages of the invention will be apparent from the following description when taken in conjunction with the accompanying drawings which illustrate preferred embodiments of the invention by way of example.

Figure 1:
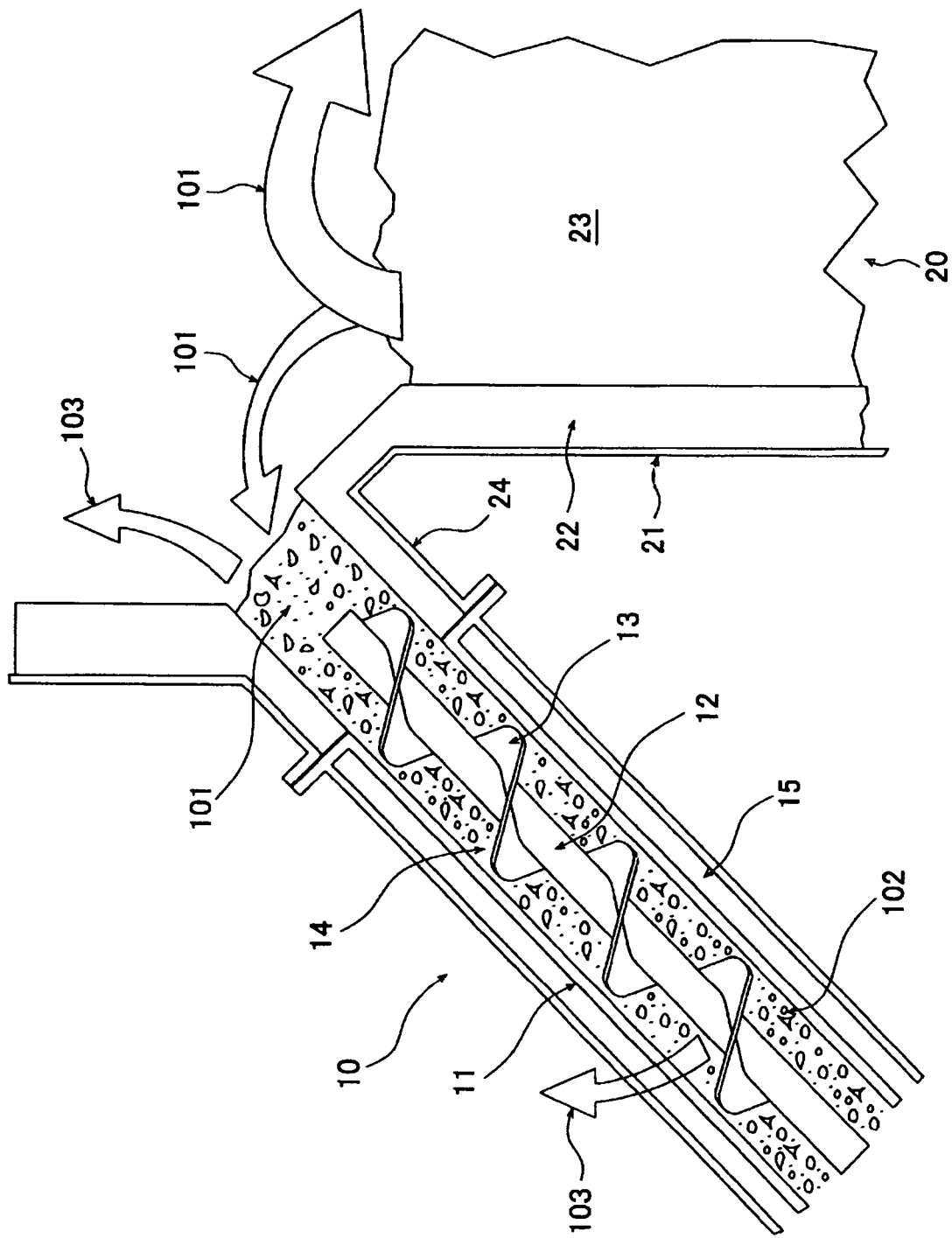
FIG. 1 is a schematic view, showing an example of a supplying apparatus for supplying a combustible material according to the invention.

FIG. 1 is a schematic view, showing an example of a supplying apparatus for supplying a combustible material of the invention. In FIG. 1, the hopper to store the combustible material is omitted for simplifying the illustration. The reference numeral 20 denotes a chamber such as a fluidized-bed gasifier chamber or a combustion chamber. The chamber 20 has a chamber casing 21, a fire-resistant layer 22 disposed inside of the chamber casing 21, and a fluidized bed 23 in which a bed material 101 is fluidized. The reference numeral 10 denotes a screw conveyor serving as a supplying apparatus for supplying a combustible material including combustible wastes or the like into the chamber 20. The combustible material includes municipal wastes, industrial wastes, waste plastic, biomass (thinned plants, wood chips, construction scrap wood, sludge, etc.), coal, RDF, wastes of high water contents, where the biomass and wastes of high water contents are known as materials not to provide high material sealing effects. A supplying apparatus for supplying a combustible material according to the present invention, however, allows high material sealing effects of the biomass and wastes of high water content as well as the other combustible materials.

The screw conveyor 10 has a cylindrical conveyor casing 11, a screw 14 disposed within the conveyor casing 11, and a steam jacket 15 provided around the conveyor casing 11. The screw 14 has a rotational shaft 12 and a helical vane 13 attached thereto. The screw conveyor 10 is inclined at an angle of 20 degrees or more and 80 degrees or less with respect to the horizontal plane so that a flow line of the flow passage of the combustible material is directed upward at the same angle of the screw conveyor 10. Thus, transportation by the screw conveyor 10 is directed upward. The conveyor casing 11 has an end connected to a raw material supply port 24 of the chamber 20. The screw 14 has an end inserted into the raw material supply port 24.

The raw material supply port 24 is located above the fluidized bed 23, (i.e., above an surface of a dense fluidized bed). When the screw 14 of the screw conveyor 10 is rotated, a combustible material 102 is supplied through the raw material supply port 24 to the chamber 20 above the surface of the dense fluidized bed. A high-temperature bed material 101 ejected from the fluidized bed 23 flows through the raw material supply port 24 into the conveyor casing 11 of the screw conveyor 10, and the inside of the conveyor casing 11 is filled with the high-temperature bed material 101. Specifically, the entire inside of the conveyor casing 11 is filled with the high-temperature bed material 101 in a clearance between the screw 14 and the conveyor casing 11.

As described above, the inside of the conveyor casing 11 is filled with the combustible material 102 and the bed material 101 to achieve material sealing effects. In other words, the bed material 101, which is smaller than the combustible material 102, enters spaces formed in the combustible material 102 to enhance material sealing effects. The "material sealing effect" means a function of the combustible material 102 and the bed material 101 to prevent gas communication under condition of being not completely airtight, but not easy for a gas to communicate even if there exists more or less gas communication. A gas includes air, moisture (vaporized water), combustible gas and combustion gas. A medium having a function to prevent gas communication is, for example, a fine particle material, such as bed material 101, having an average particle diameter of 1 mm or smaller, or a sludged material containing moisture. As a fine particle material, the bed material 101 which forms the fluidized bed 23 is preferable. Use of the bed material 101 prevents a different material from mixing in the fluidized bed 23 and does not require any other material as a medium to prevent gas communication. The bed material 101 may be introduced through the raw material supply port 24 from the fluidized bed 23. Alternatively, if the bed material supplying port 16 (see FIG. 4) is provided at (i.e., communicating with) the conveyor casing 11, as described later, then the bed material 101 may be introduced directly from the fluidized bed 23 or may be introduced from the apparatus for processing incombustible extracting 51 (see FIG. 8) through a piping as a flow passage of the bed material 101. Introduction from the apparatus for processing incombustible extracting 51 (FIG. 8) provides the bed material 101 having a lower temperature. Further, in a flow passage from the apparatus for processing incombustible extracting 51 (see FIG. 8) to the conveyor casing 11 may be additionally disposed a device for lowering the temperature of the bed material 101. Fly ash 55 (see FIG. 8) recovered in treatment of gas emission may be used as fine particle material. The fly ash 55 is generally finer particles and therefore enhances material sealing effects. Alternatively, silica sands may also be supplied outside of a system. A sludge produced in a sewage treatment plant may be used as sludged material. Use of the sludge as a medium to prevent gas communication enhances the material sealing effects of the combustible material supplying apparatus 10 and allows the sludge to be treated.

Material sealing effects of supplied small and large cakes of a combustible material may be enhanced by setting small cakes of a combustible material (co-fuel, etc.) into the space among large cakes of a combustible material. For example, a combustible material crushed to a cake with a diameter of about 30 cm by a reciprocation crushing machine, or crushed to a cake with a diameter of about 15 cm by a rotating crushing machine may be supplied as large cakes, where biomass (chips, chaffs, wooden pellets, granulated sludge, etc.) with a diameter of about 5 cm or smaller, RDF, other wastes pressed and formed, and the like may be supplied as small cakes, resulting in the aforementioned material sealing effects.

Since the screw conveyor 10 is inclined at an angle 20 degrees or more and 80 degrees or less with respect to the horizontal plane so that transportation by the screw conveyor 10 is directed upward, the bed material 101 flows into the conveyor casing 11. Thus, a ratio of filling in the conveyor casing 11 is increased. Correspondingly, the resistance to flow of a gas is increased so as to prevent a gas from leaking out from the screw conveyor 10 as a part of a combustible material supplying system into the chamber 20. Specifically, it is possible to prevent air from leaking from the exterior of the chamber to the interior of the chamber. The angle of the screw conveyor 10 is preferably 30 degrees or larger, more preferably 40 degrees or larger. Increase of the angle increases the ratio of filling and further increases the material sealing effects. Meanwhile, the angle of screw conveyor 10 is preferably 60 degrees or smaller, more preferably 50 degrees or smaller. By limiting the angle of the screw conveyor 10 so as not to be excessively large, there occurs no interference between the screw conveyor 10 and the chamber casing 21. Additionally, the efficiency of transportation of the screw conveyor 10 can be prevented from degrading. However, when the bed material 101 is filled for the purpose of an increase in the material sealing effects, then the angle of the screw conveyor 10 may be a predetermined angle out of the range defined above.

Figure 2:
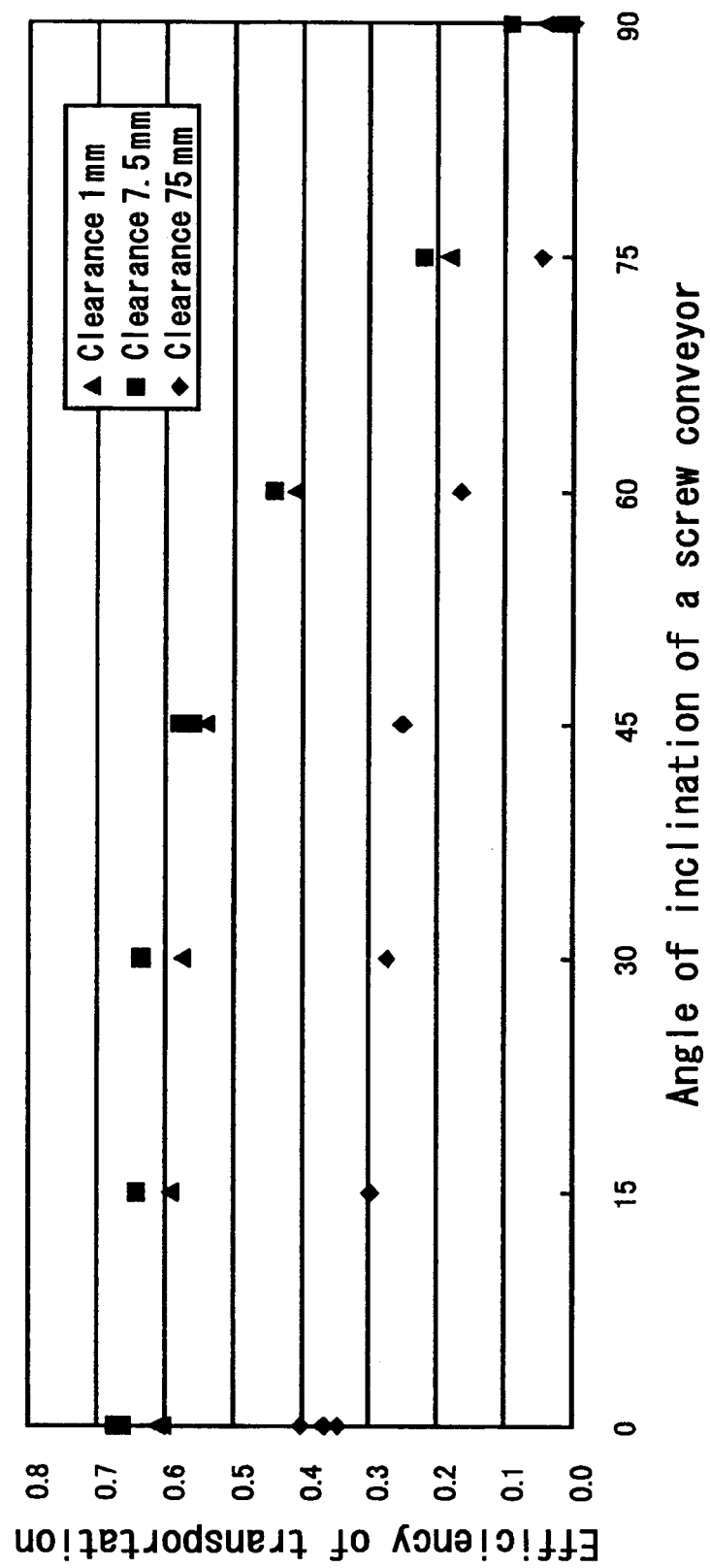
FIG. 2 is a graph, showing an example of the relation between the angle of inclination and the efficiency of transportation, both of a screw conveyor.

Now, in FIG. 2, a relation between the angle of inclination and the efficiency of transportation, of the combustible material supplying apparatus 10 is described. FIG. 2 is a graph, showing a result of a measurement for the efficiency of transportation by using sand as an article to be transported, in which the angle of inclination of the screw conveyor 10 with respect to a horizontal plane varies, for each of different clearances between the outermost edge of the helical vane 13 (see FIG. 1) and the inner face of the conveyor casing 11. The reduction in the efficiency of transportation is less when the angle of inclination is approximately up to 45 degrees. When the angle exceeds 45 degrees, especially 60 degrees, the efficiency is reduced considerably. Beyond 75 degrees, the efficiency becomes near zero. It is believed that the reduction of the efficiency of transportation with the increase of the angle of inclination is caused by the reduction of friction between the article to be transported and the inner face of the conveyor casing 11 to rotate the article together with the helical vane 13 and thus the article is not pushed out in the axial direction.

Figure 3A:
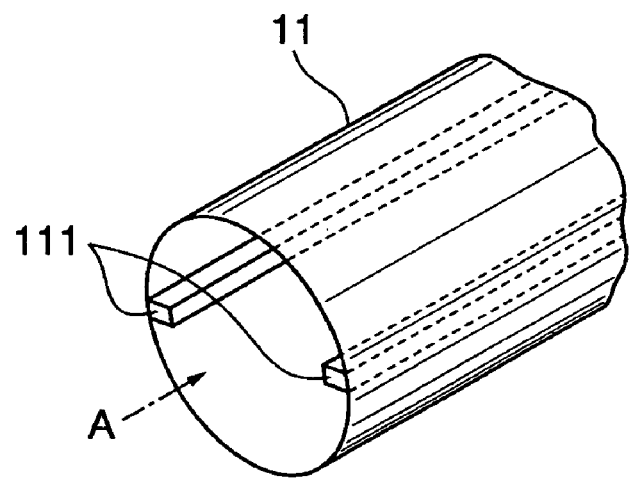
FIG. 3 shows an example of a projection which is provided on the inner face of a conveyor casing in which a helical vane is contained, for maintaining the efficiency of transportation.
Figure 3B:
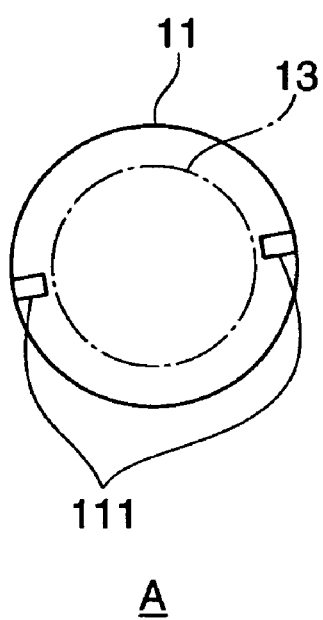

Accordingly, as shown in FIG. 3, in the inner face of the conveyor casing as a shell for containing the helical vane 13 of the screw conveyor 10, a projection 111 for preventing the combustible material 102 and the bed material 101 from rotating together with the helical vane 13 can be provided. Rotation of the transported article (the combustible material 102 and the bed material 101) accompanying the helical vane 13 is disturbed by the projection 111, or the clearance formed between the helical vane 13 and the projection 111 is diminished. Thus, rotation of the transported article around the rotary shaft 12 (so called co-rotation) is disturbed. In such a manner, since the rotation of the transported article accompanying the helical vane 13 is prevented, the transported article is axially moved by rotation of the helical vane 13 and securely pushed upward, resulting in maintaining the efficiency of transportation. That is, the reduction of the efficiency of transportation is prevented. The clearance between the helical vane 13 and the projection 111 is set 50 mm or less, preferably 20 mm or less, more preferably 5 mm or less. A preferable projection 111 has a shape continuously straightened in the longitudinal direction of the conveyor casing 11 in view of manufacturability and smaller friction in the direction of transportation. The projection 111 may include a plurality of short projections linearly spaced from each other. The projection 111 may be arranged helically or randomly. Although two projections 111 are shown in FIG. 3, the number of projections may be one and three or more.

As described above, since the raw material supply port 24 in fluid communication with the end of the conveyor casing 11 of the screw conveyor 10 is located above the surface of the dense fluidized bed, a bed material 101 ejected from the fluidized bed 23 flows through the raw material supply port 24 into the conveyor casing 11. However, a pressure of the fluidized bed 23 is not applied to the interior of the screw conveyor 10. A gas in the chamber 20 is therefore prevented from flowing through the screw conveyor 10 in a reverse direction and from leaking out of the chamber 20.

The height and an opening angle of the raw material supply port 24, the height of the fluidized bed 23, and a fluidized state in the fluidized bed 23 are properly determined so that the bed material 101 ejected in the fluidized bed 23 due to fluidization is likely to flow into the conveyor casing 11. Thus, the raw material supply port is used as a part of the medium supplying apparatus which transports the bed material 101 into the screw conveyor casing 11.

Now, the constitution of the fluidized bed 23 is described. The fluidized bed 23 is composed of a dense fluidized bed which is located at a vertically lower portion of the fluidized bed 23 and densely contains the bed material 101 (silica sands, for example) fluidized by a fluidizing gas, and a splash zone, existing vertically above the dense fluidized bed. In the splash zone, the bed material 101 splashes vigorously. Above the fluidized bed 23 (that is, above the splash zone) is provided a freeboard which mainly contains a gas and merely contains the bed material 101.

If the raw material supply port 24 is disposed in a stationary bed (a range where the bed material 101 is placed during no fluidizing), then a pressure (so called counter pressure) produced by the weight of the bed material 101 acts on the inside of the screw conveyor 10. As a result, the screw conveyor 10 exposed to the counter pressure supplies the combustible material, which requires a large amount of energy to supply, otherwise the fluidized material 102 and the bed material 101 may be forced to flow back. Notwithstanding, the combustible material 102 is quantitatively supplied into the chamber casing 21 through the raw material supply port 24 because there exists a large amount of the bed material 101 around the raw material supply port 24, resulting in a high scraping effect. The screw conveyor 20 is charged with a large amount of bed material 101 ejected therein. When the screw conveyor 10 having an opening angle through which the bed material 101 ejects into the screw conveyor 10 is inclined, for example, as shown in FIG. 1, a larger amount of bed material 101 ejects into and falls on the screw conveyor 10. The angle of inclination is preferably between 30 and 60 degrees, also depending on different operation states.

If the raw material supply port 24 is installed on the freeboard 33 (see FIG. 8) above the splash zone, where no bed material 101 exists, then the scraping effect and ejection of the bed material 101 into the screw conveyor 10 are scarcely expected because there exists no bed material, though there exists no counter pressure because of a negative pressure at the region.

If the raw material supply port 24 is installed in the upper portion of the dense fluidized bed, then the counter pressure is lower and a large amount of bed material 101 is ejected into the screw conveyor 10. Further, if the bed material 101 is circling in the chamber 20, then a high scraping effect is expected and the combustible material is quantitatively supplied into the chamber casing 21 from the raw material supply port 24. If the raw material supply port 24 is installed in the splash zone, then no counter pressure exists and a large amount of the bed material 101 ejects into the screw conveyor 10.

The screw conveyor 10 is subjected to a humid and reducing atmosphere, (i.e., a severely corrosive environment). Therefore, the conveyor casing 11 and the screw 14 are required to be heated so as to maintain their temperatures. In the illustrated example, steam is introduced into the steam jacket 15 provided around the conveyor casing 11 so as to maintain the temperatures of the conveyor casing 11 and the screw 14. Thus, it is possible to prevent dew condensation and low-temperature corrosion on an inner surface of the conveyor casing 11. It is desirable that a tip end of the screw 14 is replaceable, or is subjected to surface treatment such as thermal spraying if needed.

In the conveyor casing 11 of the screw conveyor 10, the combustible material 102 and the high-temperature bed material 101 are brought into contact with each other so as to promote loosening of the combustible material. Accordingly, a mass of the combustible material 102 for an instant is prevented from falling down onto the chamber 20. It is therefore possible to prevent the variation of the amount of combustible material 102 and pressure in the chamber 20. When the combustible material 102 and the high-temperature bed material 101 are brought into contact with each other, moisture in the combustible material 102 is evaporated, and volatile matter in the combustible material 102 is pyrolyzed, to thereby generate steam and a pyrolysis gas 103. A portion of the steam (water vapor) and pyrolysis gas 103 flows through the raw material supply port 24 into the chamber 20 and further flows downstream through a freeboard, which is located at an upper portion of the fluidized bed 23. Near the material supply port 24 where the high temperature bed material 101 is injected, the combustible material 102 and the high temperature bed material 101 are brought in contact with each other to generate a gas. As described above, the combustible material 102 and the bed material 101 are provided with material sealing effects. Accordingly, the generated gas does not pass through the upstream side of the screw conveyor 10 but flows in the chamber 20.

It is desirable that the steam and pyrolysis gas 103 generated at an upstream portion of the conveyor casing 11, i.e., on the upstream of the raw material supply port 24, is extracted so as not to flow in a reverse direction and is introduced into a gas passage prior to heat recovery. With this modification, the steam and pyrolysis gas 103 can be prevented from leaking out of the screw conveyor 10 and processed certainly.

Figure 4:
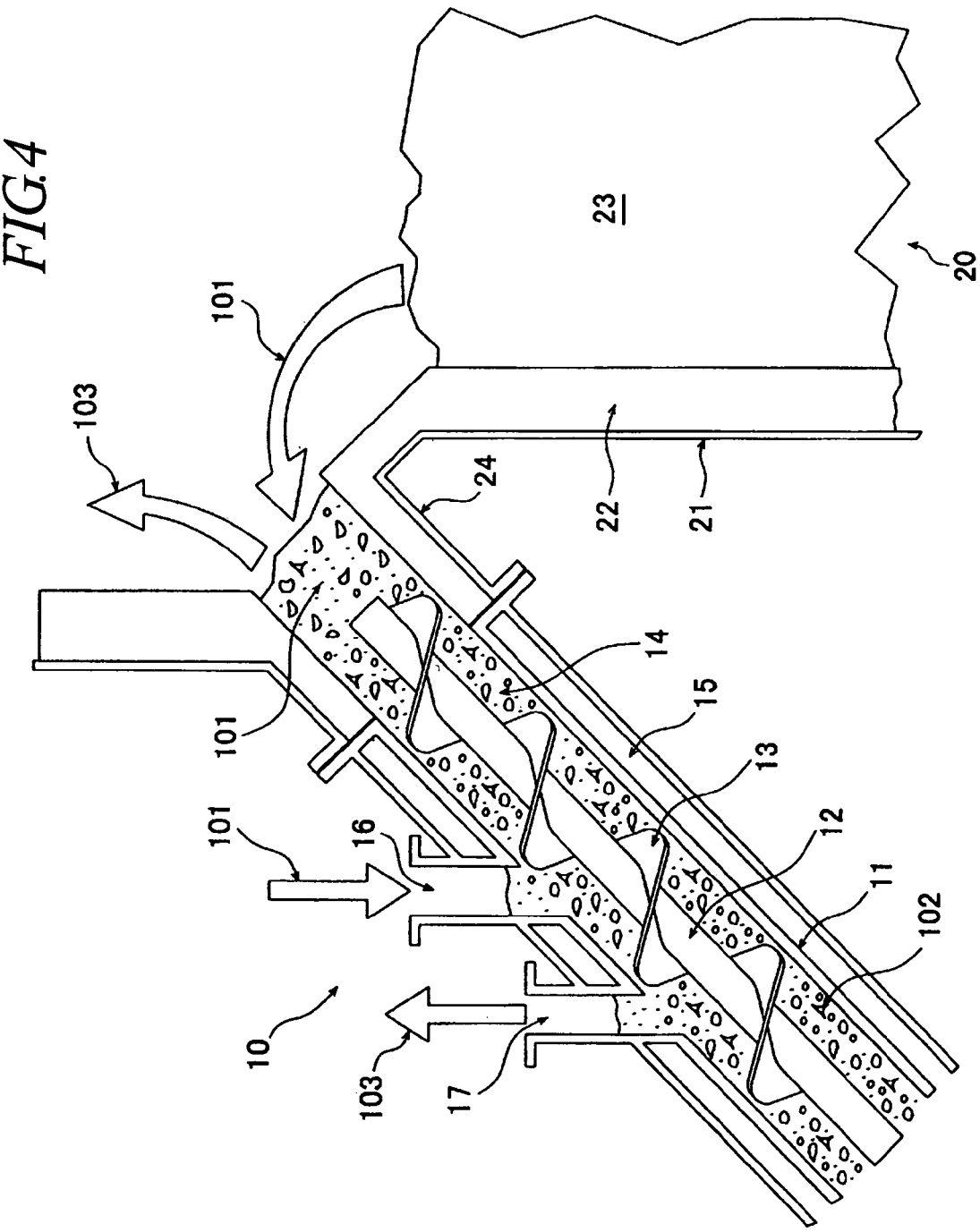
FIG. 4 is a schematic view, showing an example of a supplying apparatus for supplying a combustible material according to the invention.

This modification is shown in FIG. 4, which is a schematic view, showing an example of a combustible material supplying apparatus according to the invention. In FIG. 4, like or corresponding parts are designated by the same reference numerals as in FIG. 1 and will not be described repetitively. The combustible material supplying apparatus shown in FIG. 4 has a bed material supply port 16 for supplying a bed material 101 from a bed material circulation line, which will be described later, into the conveyor casing 11 of the screw conveyor 10, and a gas extracting port 17 for extracting steam and a pyrolysis gas 103. The gas extracting port 17 is located upstream of the bed material supply port 16. Thus, the steam and pyrolysis gas 103 generated in the conveyor casing 11 are prevented from flowing in the reverse direction and can be introduced into a gas passage prior to heat recovery process. Accordingly, the steam and pyrolysis gas 103 can be prevented from leaking out of the screw conveyor 10 and processed certainly.

The bed material 101 supplied from the chamber 20 is preferable as a medium to be supplied through the bed material supply port 16. The bed material 101 of 300° C. or more vaporizes moisture and pyrolyzes volatile matter to generate steam and pyrolysis gas. A bed material of 350° C. or more is preferable for securely producing a gas. Also, a bed material of 100° C. or more can vaporize moisture to generate steam. In such a manner, moisture and volatile matter is vaporized from a combustible material 102 in the screw conveyor 10, and then the combustible material 102 from which moisture and volatile matter was vaporized is supplied to the chamber 20. Therefore, a sharp increase (that is, variation) of the amount of gas generated from the supplied combustible material 102 in the chamber 20 is suppressed and the moisture within the chamber 20 can also be suppressed. Further, the gas generated in the screw conveyor 10 is extracted through a gas extracting port 17 and then directly fed to a subsequent stage apparatus resistant to the variation of gas pressure with bypassing the chamber 20, to thereby suppress variation of the amount of gas within the chamber 20 and to achieve stable operation of the chamber 20. Any medium having incombustiblity resistant to high temperature other than the bed material 101 may be used.

The medium supplied through the fluid medium supply port 16 is not required to be high temperature. In such a case, moisture is not vaporized, volatile matter is not pyrolyzed, and therefore both steam and pyrolysis gas cannot be generated. Nevertheless, this medium still retains the same mechanical effects as of a high temperature bed material and also a function as a medium to prevent gas communication, in other words, material sealing effects. Additionally, existence of a medium suppresses entwinement and adhesion of the combustible material 102 to the vane 13 or the like, and achieves appropriate mixing of the combustible material 102 by shearing force generated between the medium and the combustible material 102, thereby to improve a quantitative property of the combustible material to be transported. Since any steam and pyrolysis gas are not generated, the fluidized material supply port 16 is provided but not the gas extracting port 17. Further, any particle material, such as mixed fuel and auxiliary fuel other than incombustible material, such as sand may be used and combusted in the chamber 20.

Figure 5:
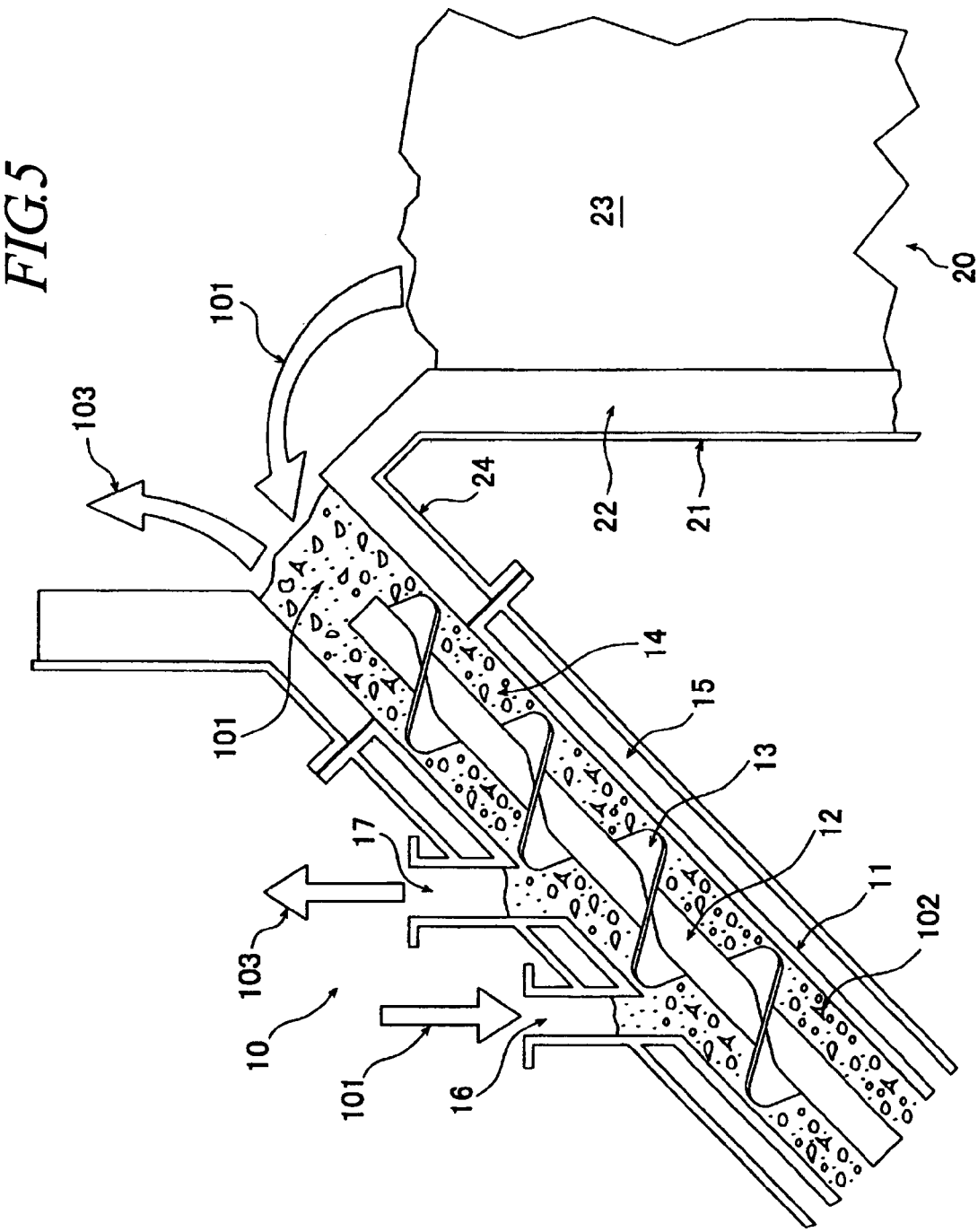
FIG. 5 is a schematic view, showing an example of a supplying apparatus for supplying a combustible material according to the invention.

As shown in FIG. 5, the bed material supply port 16 may be provided upstream of the gas drawing port 17. This arrangement is preferable to make it difficult for air to flow to the gas drawing port 17 from the combustible material supply port (not shown) which forms the upstream end of the screw conveyor 10. However, if high temperature bed material 101 is used, then a gas is generated by contact of the bed material 101 supplied through the bed material supply port 16 with the combustible material 102 and the generated gas is likely to flow outside through the combustible material supply port (not shown). It is therefore preferable to shorten the distance between the gas extracting port 17 and the bed material supply port 16 for securing leading the generated gas to the gas extracting port 17.

As shown in FIG. 4, it is preferable to provide the gas extracting port 17 upstream of the bed material supply port 16 since, even if a gas is generated by contact of the bed material 101 supplied through the bed material supply port 16 with the combustible material 102, the generated gas is introduced to the gas extracting port 17 located nearer than the combustible material supply port (not shown). It is therefore preferable to lengthen the distance between the gas extracting port 17 and the combustible material supply port (not shown) to prevent air from flowing in since air is apt to flow into the gas extracting port 17 from the combustible material supply port (not shown).

Figure 6:
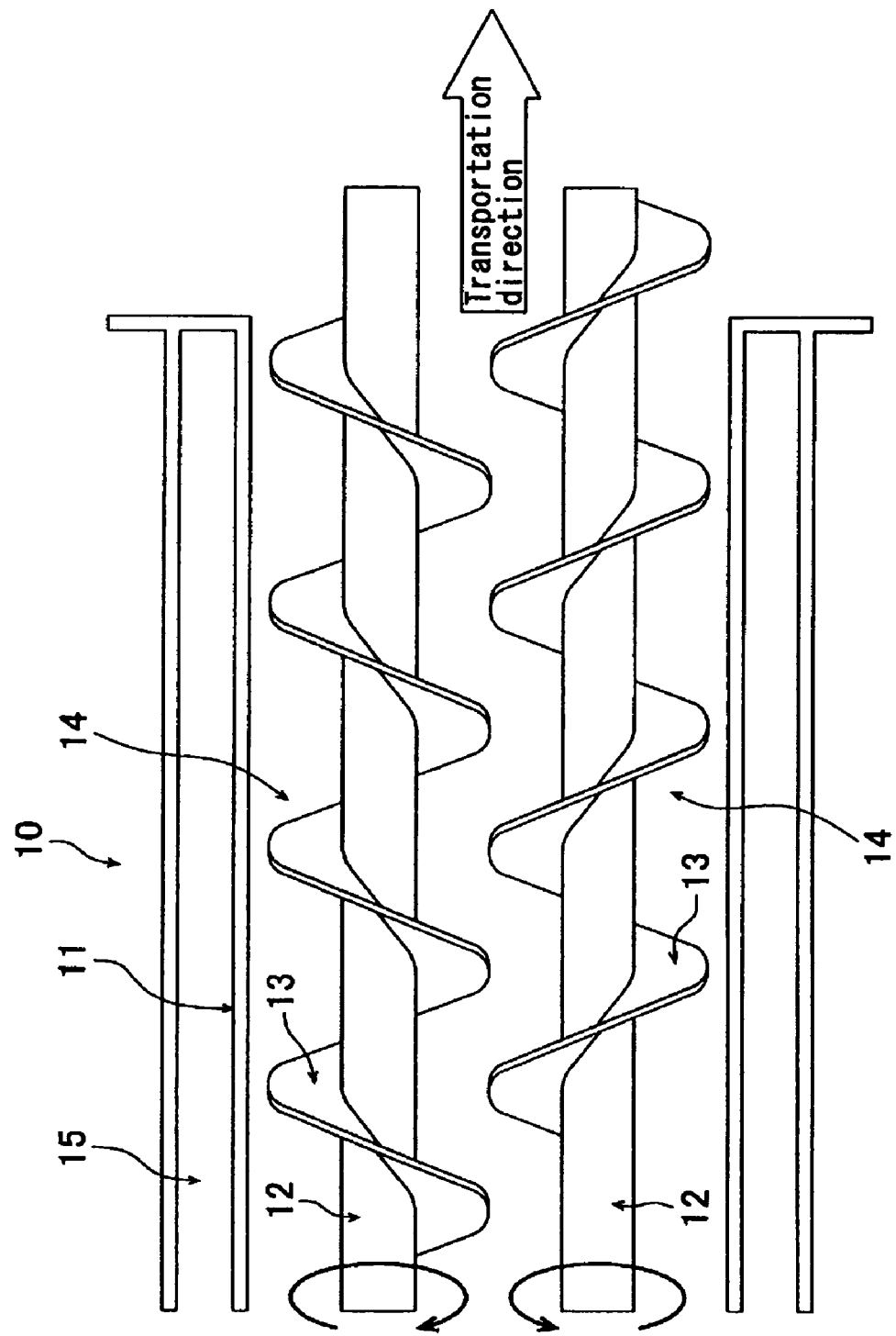
FIG. 6 shows an example of a screw conveyor for use in a supplying apparatus for supplying a combustible material according to the invention.

In the described embodiments of the combustible material supplying apparatus, the screw conveyor 10 has a screw 14 including a rotational shaft 12 and a helical vane 13 attached thereto. However, the screw conveyor 10 is not limited to those embodiments. As shown in FIG. 6, the screw conveyor 10 may have two screws 14 generally disposed parallel to each other. Alternatively, the screw conveyor 10 may have three or more screws disposed generally parallel to each other. With a plurality of screws, the screw conveyor 10 can convey a large amount of raw material and promote crushing of a combustible material 102.

Figure 7:
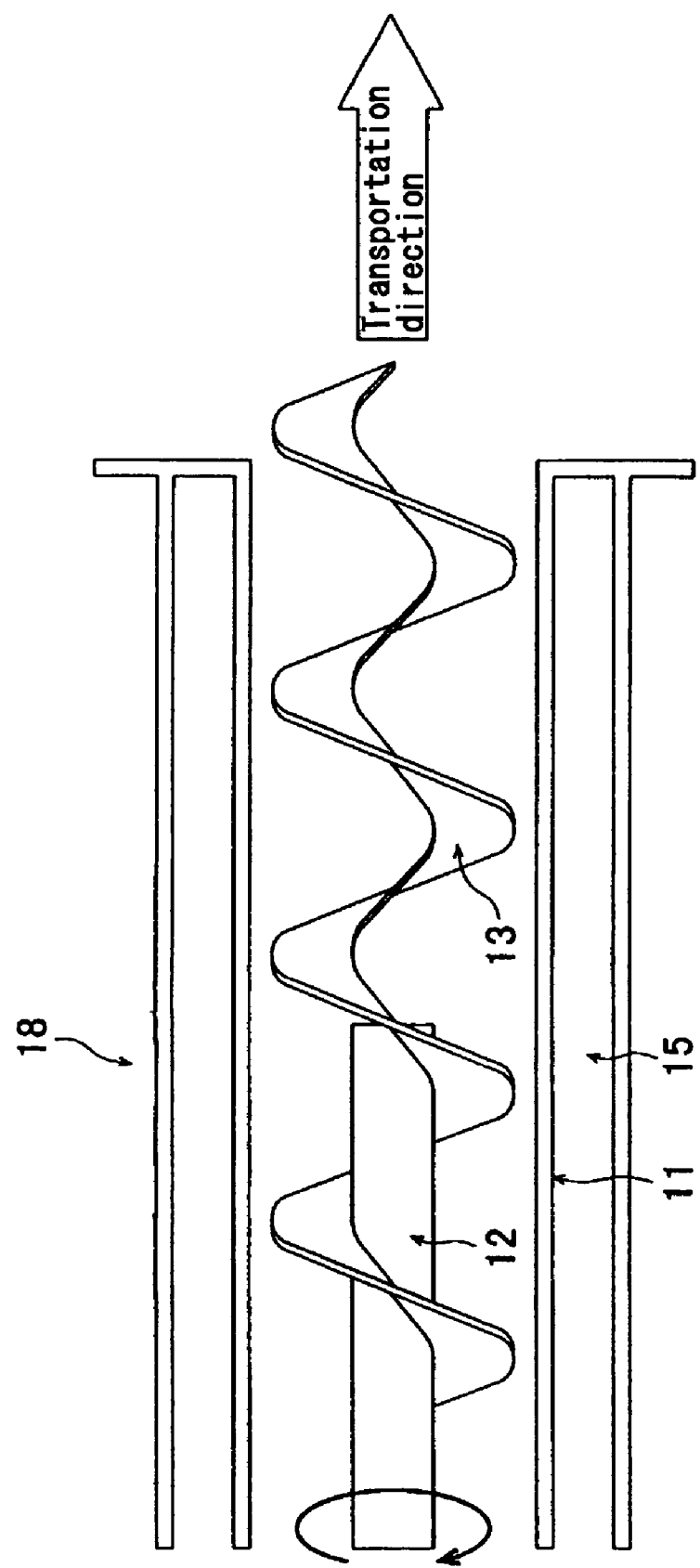
FIG. 7 shows an example of a spiral conveyor for use in a supplying apparatus for supplying a combustible material according to the invention.

The combustible material supplying apparatus in the embodiments has the screw 14 disposed in the conveyor casing 11. However, the combustible material supplying apparatus is not limited to these embodiments. For example, as shown in FIG. 7, the combustible material supplying apparatus may have a mechanical supplying device such as a spiral conveyor 18 including a rotational shaft 12 disposed in a conveyor casing 11, and a helical vane 13 attached to an end of the rotational shaft 12. In this case, a plurality of rotational shafts 12 each having a helical vane 13 may be arranged parallel to each other in the conveyor casing 11.

Figure 8:
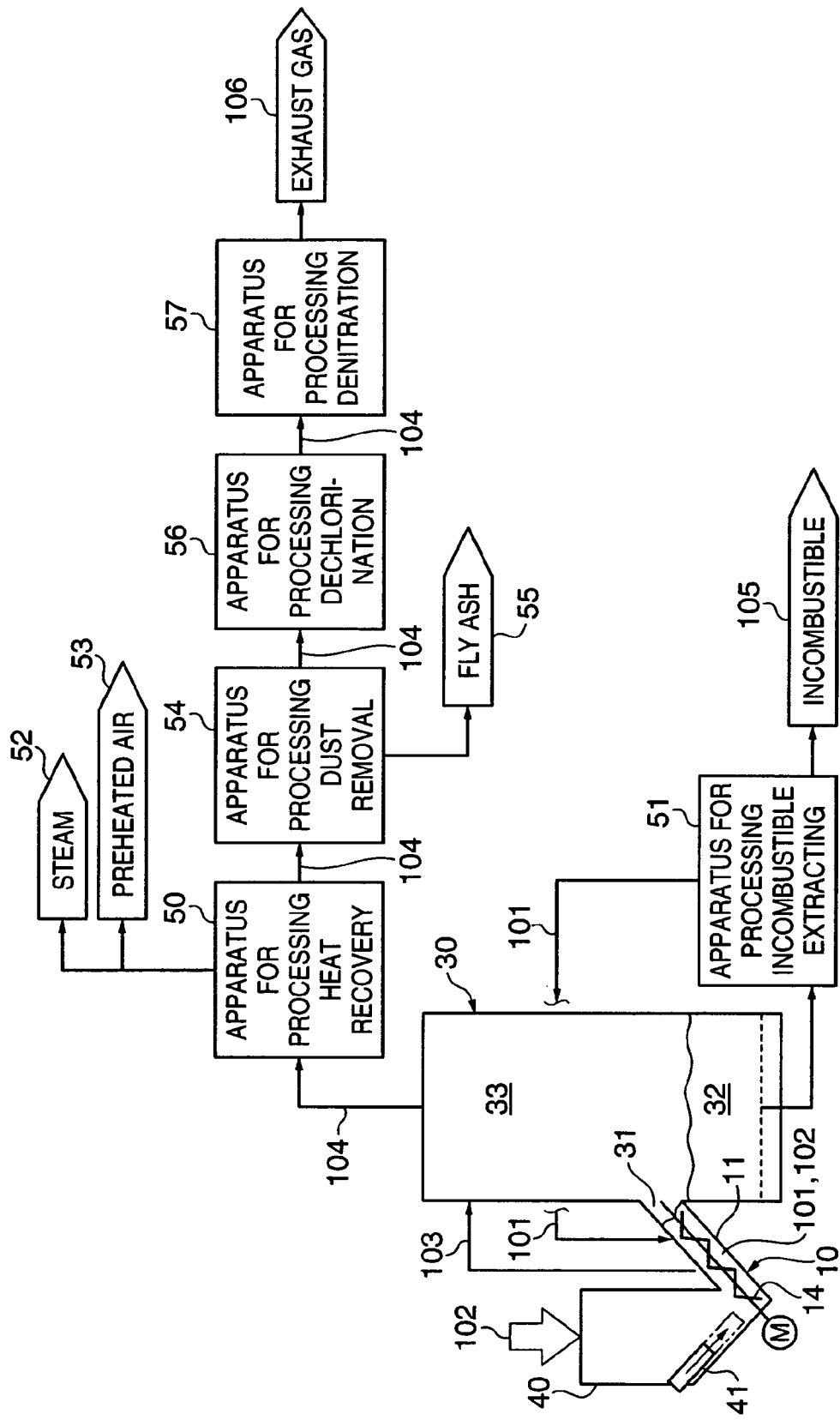
FIG. 8 is a schematic diagram, showing an example of an incineration facility having a supplying apparatus for supplying a combustible material according to the invention and a fluidized-bed incineration chamber.

FIG. 8 is a schematic diagram showing an example of an incineration facility having the supplying apparatus 10 for supplying a combustible material 102 according to the invention and a fluidized-bed incineration furnace. In FIG. 8, the reference numeral 30 denotes a combustion chamber of a fluidized-bed incineration furnace. The fluidized-bed incineration chamber 30 has a raw material supply port 31 to which one end of the conveyor casing 11 of the screw conveyor 10 is connected. Another end of the conveyor casing 11 is connected to a raw material hopper 40, into which a combustible material 102 is introduced. The raw material hopper 40 has a pusher 41 disposed at the bottom to push a combustible material 102 in the raw material hopper 40 into the end of the conveyor casing 11. If the screw conveyor 10 is installed horizontally, then the combustible material 102 is supplied, by gravity, through a material hopper which has a vertical axis normal to the horizontal axis of the screw conveyor 10 and connected with an upper portion thereof. When the screw conveyor 10 is placed to be inclined, the combustible material 102 is not appropriately supplied only with gravity because the axis of the material flow comes near the horizontal axis from the vertical axis. It is therefore preferable to supply the combustible material 102 with assistance of a pusher 41 to push the combustible material 102 into the screw conveyor 10.

When the screw 14 of the screw conveyor 10 is rotated, the combustible material 102 pushed by the pusher 41 is moved downstream and supplied through the raw material supply port 31 of the incineration chamber 30 to an upper portion of a fluidized bed 32 (above a surface of the dense fluidized bed). The supplied combustible material is combusted into a combustion gas 104 in the fluidized bed 32. The combustion gas 104 flows through a freeboard 33 of the incineration chamber 30 into an apparatus for processing heat recovery 50. An incombustible material 105 in the combustible material 102 is discharged from a bottom of the fluidized bed 32 together with a bed material 101 into an apparatus for processing incombustible extracted material 51. In the apparatus for processing incombustible extracted material 51, the incombustible material 105 is extracted (separated) from the bed material 101.

A portion of a bed material (mainly silica sand) 101 flows through the raw material supply port 31 into the conveyor casing 11 of the screw conveyor 10 due to fluidization of the bed material 101 in the fluidized bed 32. Simultaneously, a bed material 101 separated from the incombustible material 105 in the apparatus for processing incombustible extracted material 51 is supplied through the bed material supply port 16 of the screw conveyor 10 (see FIG. 4) into the conveyor casing 11. Thus, with a pass of the bed material 101 to the inside of the conveyor casing 11 separate from that through the raw material supply port 31, the conveyor casing 11 is filled with the bed material 101. Accordingly, by high material sealing effects caused by mixture of the bed material 101 and the combustible material 102, external air is prevented from leaking through the screw conveyor 10 into the incineration chamber 30, and the combustion gas 104 generated in the incineration chamber 30 is prevented from leaking out of the incineration chamber 30 through the screw conveyor 10. Incombustible particles are used as a bed material.

By supplying the bed material 101 separated in the apparatus for processing incombustible extracted material 51 to the conveyor casing 11 of the screw conveyor 10, it is possible to eliminate a bed material circulation line to return the bed material 101 separated in the apparatus for processing incombustible extracted material 51 to the fluidized bed 32.

When the combustible material 102 and the high-temperature bed material 101 are brought into contact with each other in the conveyor casing 11 of the screw conveyor 10, moisture in the combustible material 102 is evaporated and the combustible material 102 is pyrolyzed. Therefore, steam (water vapor) and pyrolysis gas 103 is generated. A portion of the steam (water vapor) and pyrolysis gas 103 generated in the conveyor casing 11 flows through the raw material supply port 31 into the freeboard 33, and the rest is extracted from the gas extracting port 17 (see FIG. 4) and supplied to the freeboard 33.

The apparatus for processing heat recovery 50 has a waste heat boiler for producing steam 52 and an air preheater for producing preheated air 53, which is used as fluidizing air or combustion air to be supplied to the incineration chamber 30. Heat is recovered from the combustion gas 104 in the apparatus for processing heat recovery 50 to lower the temperature of the combustion gas 104. The combustion gas 104 is then supplied to a bag filter or the like to remove fly ash 55. Thereafter, the combustion gas 104 is supplied to an apparatus for processing dechlorination 56 to dechlorinate the combustion gas 104 and an apparatus for processing denitration 57 to denitrate the combustion gas 104 and then released as an exhaust gas 106 to atmosphere through a chimney (not shown).

Figure 9:
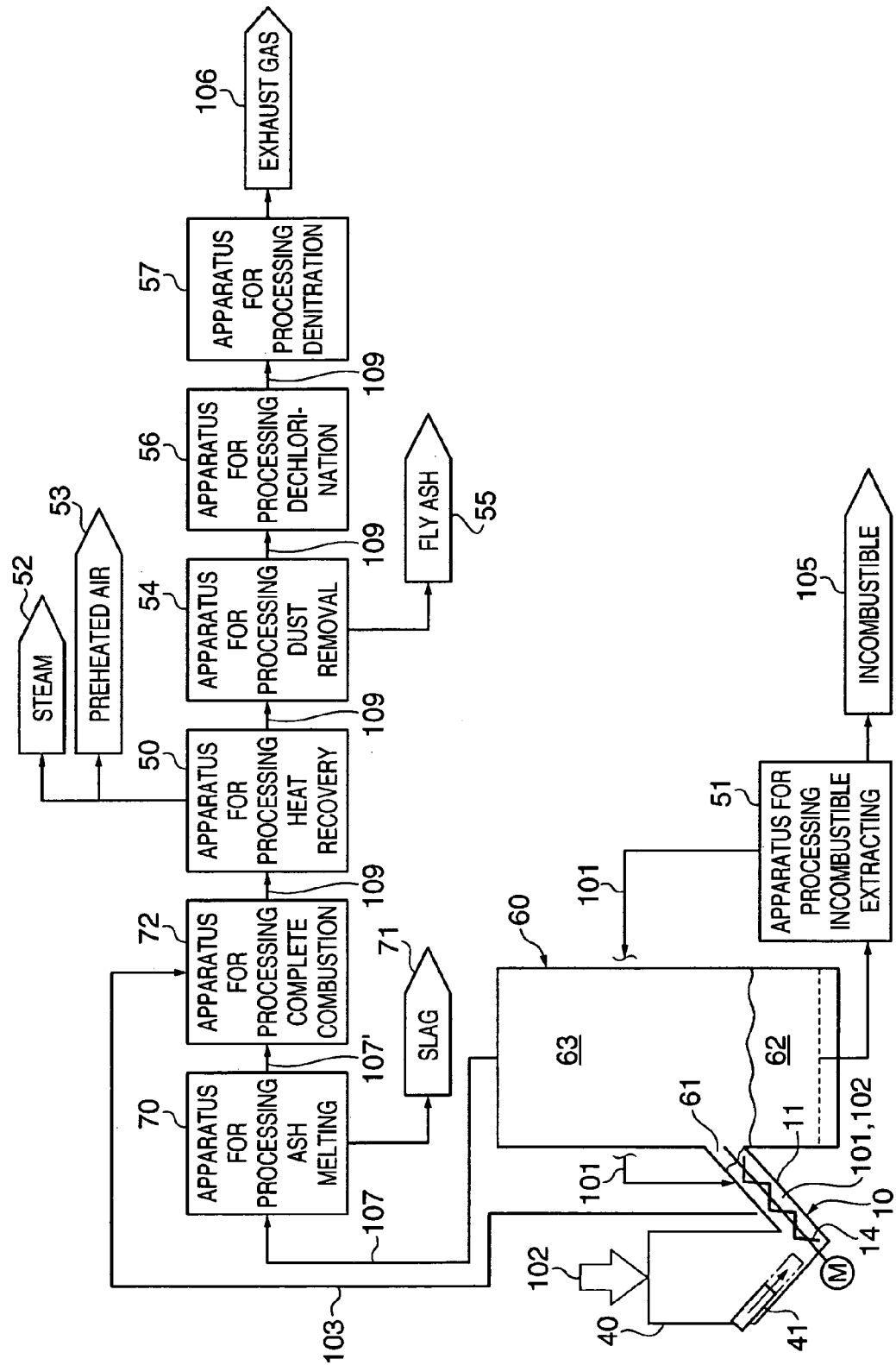
FIG. 9 is a schematic view, showing an example of a gasification and slagging combustion facility having a supplying apparatus for supplying a combustible material according to the invention and a fluidized-bed gasifier chamber.

FIG. 9 is a schematic view showing an example of a gasification and slagging combustion facility, which is a model of a gasification apparatus, having the combustible material supplying apparatus according to the invention and a fluidized-bed gasifier which is equipped with a gasifier chamber. In FIG. 9, like or corresponding parts are designated by the same reference numerals as in FIG. 8 and will not be described repetitively. A combustible material 102 is supplied through a raw material supply port 61 of a gasifier chamber 60 to an upper portion of a fluidized bed 62 (above an surface of a dense fluidized bed) by the screw conveyor 10. The combustible material 102 is pyrolyzed and gasified in the fluidized bed 62 to generate a gas 107. The generated gas 107 flows through a freeboard 63 of the gasifier chamber 60 into an apparatus for processing ash melting 70. In the apparatus for processing ash melting 70, the generated gas 107 is combusted at a high temperature together with char (fixed carbon) contained in the generated gas 107 to melt ash in the generated gas 107 into slag 71, which is discharged to the exterior of the system. A combustion gas 107' from which ash has been removed is supplied to an apparatus for processing complete combustion 72.

The conveyor casing 11 of the screw conveyor 10 is filled with a bed material 101, as in the case of FIG. 8. Accordingly, by high material sealing effects caused by mixture of the bed material 101 and the combustible material 102, external air is prevented from leaking through the screw conveyor 10 into the gasifier chamber 60, and the generated gas 107 generated in the gasifier chamber 60 is prevented from leaking out of the gasifier chamber 60 through the screw conveyor 10.

When the combustible material 102 and the high-temperature bed material 101 are brought into contact with each other in the conveyor casing 11 of the screw conveyor 10, moisture in the combustible material 102 is evaporated and combustible material 102 is pyrolyzed. Therefore, steam (water vapor) and pyrolysis gas 103 is generated. A portion of the steam (water vapor) and pyrolysis gas 103 flows through the raw material supply port 61 into the freeboard 63, and the rest is extracted from the gas extracting port 17 (see FIG. 4) and supplied to the apparatus for processing complete combustion 72, in which the rest of the steam and pyrolysis gas 103 is completely combusted together with the combustion gas 107' supplied from the apparatus for processing ash melting 70.

A combustion gas 109 generated by complete combustion in the apparatus for processing complete combustion 72 is subjected to heat recovery in an apparatus for processing heat recovery 50. The combustion gas 109 is then supplied to an apparatus for processing dust removal 54 to remove fly ash 55. Thereafter, the combustion gas 109 is supplied to an apparatus for processing dechlorination 56 to dechlorinate the combustion gas 109 and an apparatus for processing denitration 57 to denitrate the combustion gas 109, and is then released as an exhaust gas 206 to atmosphere through a chimney (not shown).

Figure 10:
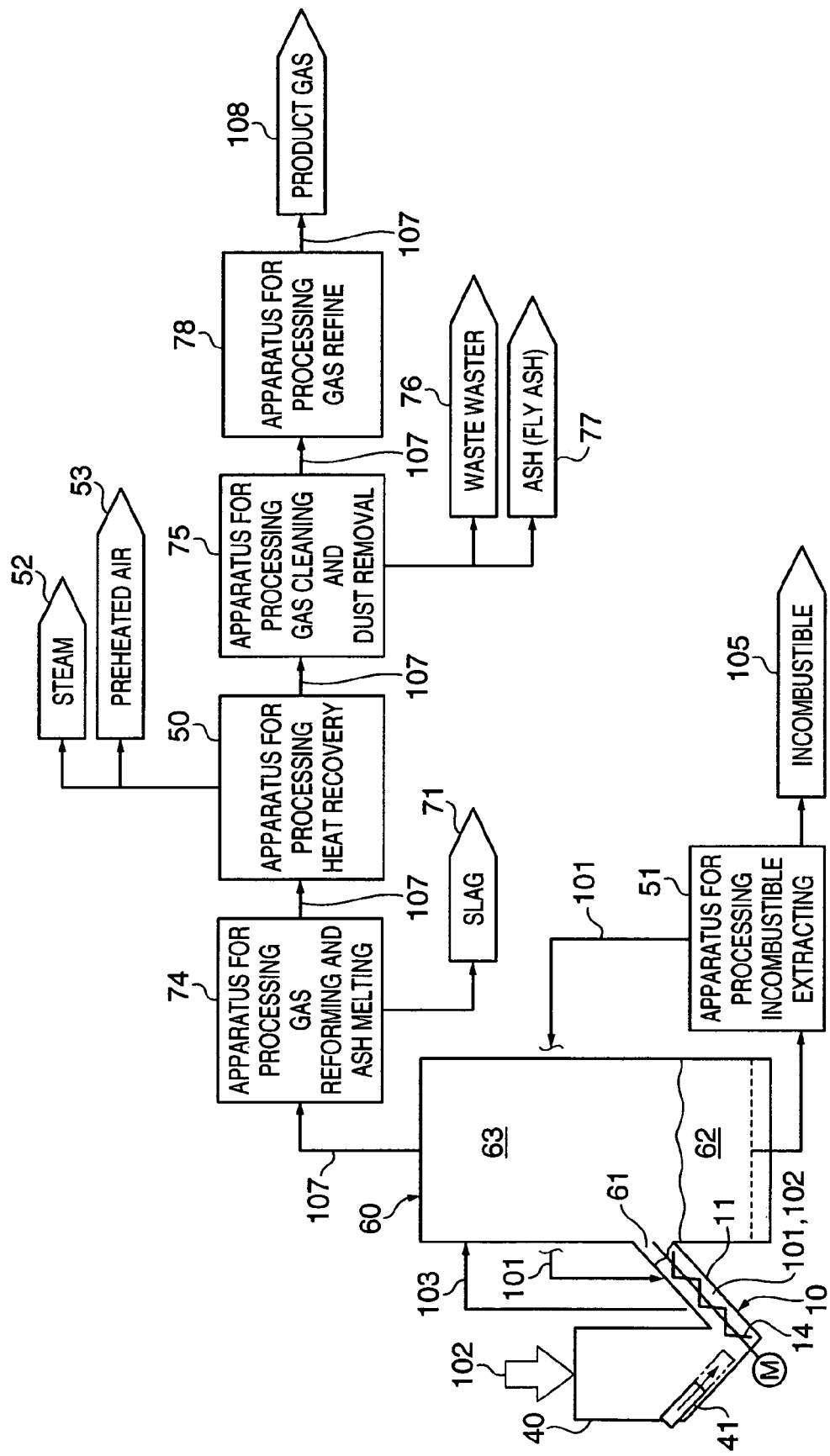
FIG. 10 is a schematic view, showing an example of a gasification reforming facility having a supplying apparatus for supplying a combustible material according to the invention.

FIG. 10 is a schematic view, showing an example of a gasification reforming facility, which is a model of a gasification apparatus, having the combustible material supplying apparatus according to the invention. In FIG. 10, like or corresponding parts are designated by the same reference numerals as in FIGS. 8 and 9 and will not be described repetitively. A combustible material 102 is supplied through a raw material supply port 61 of a gasifier chamber 60 to an upper portion of a fluidized bed 62 (above a surface of a dense fluidized bed) by the screw conveyor 10. The combustible material 102 is pyrolyzed and gasified in the fluidized bed 62 to generate a gas 107. The generated gas 107 flows through a freeboard 63 of the gasifier chamber 60 into an apparatus for processing gas reforming and ash melting 74. In the apparatus for processing gas reforming and ash melting 74, the generated gas 107 is reformed, and simultaneously a portion of the generated gas 107 is combusted at a high temperature to melt ash into slag 71, which is discharged to the exterior of the system. The combustion gas 107 is discharged from the apparatus for processing gas reforming and ash melting 74 to an apparatus for processing heat recovery 50.

Heat is recovered from the generated gas 107 in the apparatus for processing heat recovery 50 to lower the temperature of the generated gas 107. The generated gas 107 is then supplied to an apparatus for processing gas cleaning and dust removal 75. In the apparatus for processing gas cleaning and dust removal 75, water is ejected to the generated gas 107 to clean the generated gas 107 and drainage 76 and ash (fly ash) 77 is removed. The generated gas 107 which has been cleaned is supplied to an apparatus for processing gas refining 78 to generate a product gas 108.

The conveyor casing 11 of the screw conveyor 10 is filled with a bed material 101, as in the cases of FIGS. 8 and 9. Accordingly, due to high material sealing effects due to a mixture of the bed material 101 and the combustible material 102, external air is prevented from leaking through the screw conveyor 10 into the gasifier chamber 60, and the generated gas 107 generated in the gasifier chamber 60 is prevented from leaking out of the gasifier chamber 66 through the screw conveyor 10.

When the combustible material 102 and the high-temperature bed material 101 are brought into contact with each other in the conveyor casing 11 of the screw conveyor 10, moisture in the combustible material 102 is evaporated and combustible material 102 is pyrolyzed. Therefore, steam (water vapor) and pyrolysis gas 103 is generated. A portion of the steam (water vapor) and pyrolysis gas 103 flows through the raw material supply port 61 into the freeboard 63, and the rest is extracted from the gas extracting port 17 (see FIG. 4) and supplied to the freeboard 63.

Figure 11:
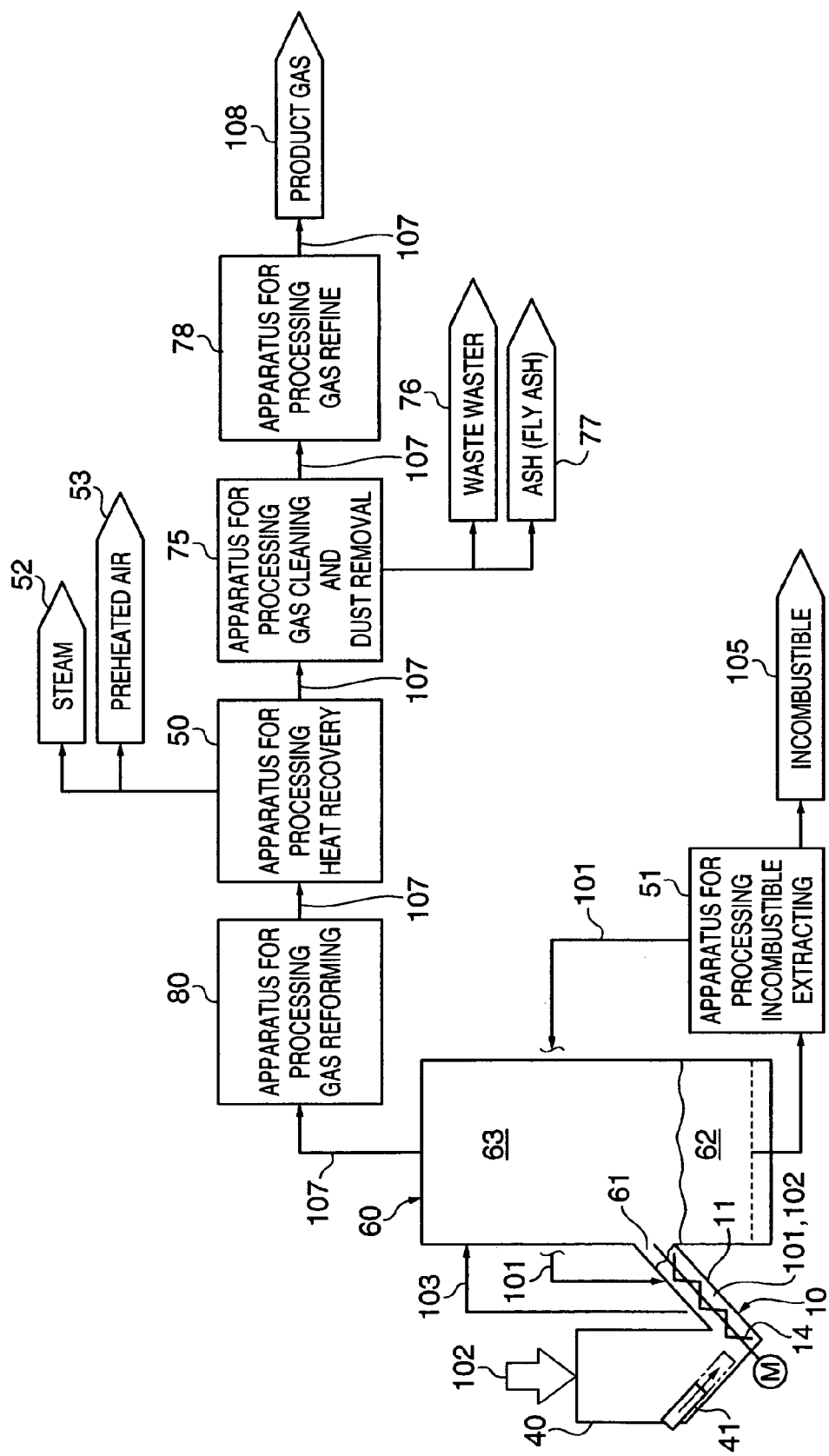
FIG. 11 is a schematic view, showing an example of a low-temperature gasification reforming facility having a supplying apparatus for supplying a combustible material according to the invention.

FIG. 11 is a schematic view, showing an example of a low-temperature gasification reforming facility, which is a model of a gasification apparatus, having a combustible material supplying apparatus according to the invention. In FIG. 11, like or corresponding parts are designated by the same reference numerals as in FIGS. 8 through 10 and will not be described repetitively. A combustible material 102 is supplied through a raw material supply port 61 of a gasifier chamber 60 to on upper portion of a fluidized bed 62 (above an surface of a dense fluidized bed) by the screw conveyor 10. The combustible material 102 is pyrolyzed and gasified in the fluidized bed 62 to generate a gas 107. The generated gas 107 flows through a freeboard 63 of the gasifier chamber 60 into an apparatus for processing gas reforming 80, where the generated gas 107 is reformed. Then, the generated gas 107 is supplied to an apparatus for processing heat recovery 50, where heat is recovered from the generated gas 107 to lower the temperature of the generated gas 107. The generated gas 107 is then supplied to an apparatus for processing gas cleaning and dust removal 75. In the apparatus for processing gas cleaning and dust removal 75, water is ejected to the generated gas 107 to clean the generated gas 107 and drainage 76, and ash 77 is removed. The generated gas 107 which has been cleaned is supplied to an apparatus for processing gas refine 78 to generate a product gas 108.

The conveyor casing 11 of the screw conveyor 10 is filled with a bed material 101, as in the cases of FIGS. 8 through 10. Accordingly, by high material sealing effects caused by mixture of the bed material 101 and the combustible material 102, external air is prevented from leaking through the screw conveyor 10 into the gasifier chamber 60, and the generated gas 107 generated in the gasifier chamber 60 is prevented from leaking out of the gasifier chamber 60 through the screw conveyor 10.

When the combustible material 102 and the high-temperature bed material 101 are brought into contact with each other in the conveyor casing 11 of the screw conveyor 10, moisture in the combustible material 102 is evaporated and combustible material 102 is pyrolyzed. Therefore, steam (water vapor) and pyrolysis gas 103 is generated. A portion of the steam (water vapor) and pyrolysis gas 103 flows through the raw material supply port 61 into the freeboard 63, and the rest is extracted from the gas extracting port 17 (see FIG. 4) and supplied to the freeboard 63.

Figure 12:
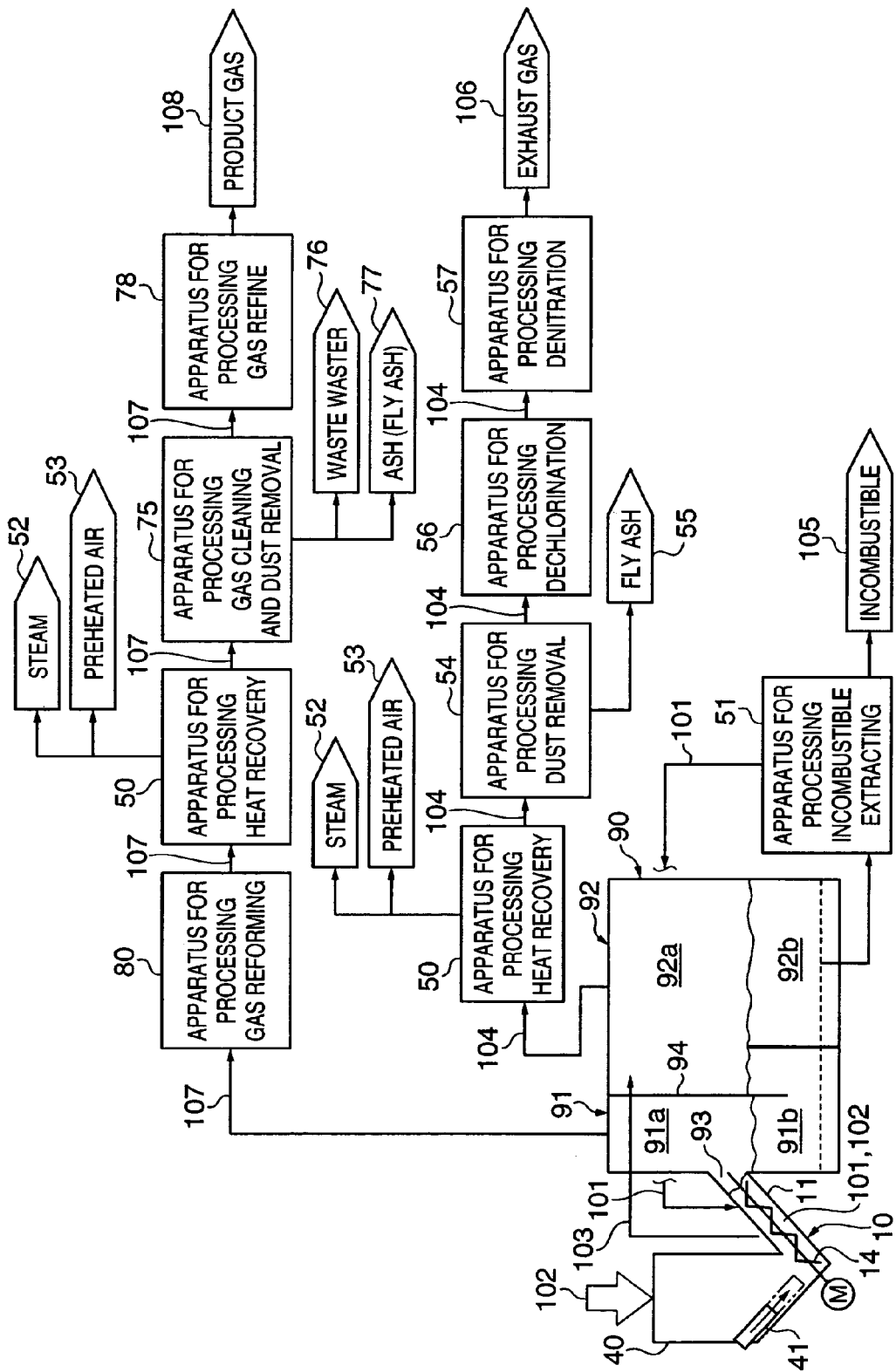
FIG. 12 is a schematic view, showing an example of a gas reforming facility having a supplying apparatus for supplying a combustible material according to the invention and an integrated fluidized-bed gasifier chamber.

FIG. 12 is a schematic view, showing an example of a gas reforming facility, which is a model of a gasification apparatus, having the combustible material supplying apparatus according to the invention and an integrated fluidized-bed gasifier. The integrated fluidized-bed gasifier is a gasification facility having a fluidized-bed gasifier 90 in which a gasifier chamber 91 for pyrolyzation and gasification and a combustion chamber 92 for combustion of char produced by pyrolyzation are included and a bed material 101 is allowed to circulate freely between both chambers 91, 92. A fluidized bed 91b in the gasifier chamber 91 is fluidized by a gas which does not include oxygen such as steam, and is heated to keep a temperature between about 600 and 850° C. by a bed material 101 circulating from the combustion chamber 92. The combustible material 102 supplied to the gasifier chamber 91 is pyrolyzed and gasified. A fluidized bed 92b in the combustion chamber 92 is fluidized by an oxygen containing gas, such as air. A pyrolyzation residue fed from the gasifier chamber 91 is completely combusted in the combustion chamber 92. Heat of combustion resulting from this combustion reaction heats the fluidized bed 92b in the combustion chamber 92. The fluidized bed 92b in the combustion chamber 92 has a temperature kept between about 700 and 950° C., which is higher than that of the fluidized bed 91b in the gasifier chamber 91. In FIG. 12, like or corresponding parts are designated by the same reference numerals as in FIGS. 8 through 11 and will not be described repetitively. The integrated fluidized-bed gasifier 90 has a raw material supply port 93. An end of the conveyor casing 11 of the screw conveyor 10 is connected to the raw material supply port 93 of the gasifier chamber 91. Another end of the conveyor casing 11 is connected to a raw material hopper 40, into which a combustible material 102 is introduced. The raw material hopper 40 has a pusher 41 disposed at the bottom to push a combustible material 102 in the raw material hopper 40 into the other end of the conveyor casing 11.

A combustible material 102 is supplied through the gasifier chamber 91 of the integrated gasifier 90 to an upper portion of a fluidized bed 91b (above a surface of a dense fluidized bed) by the screw conveyor 10. The combustible material 102 is pyrolyzed and gasified in the fluidized bed 91b to generate a gas 107. The generated gas 107 flows through a freeboard 91a of the gasifier chamber 91 into an apparatus for processing gas reforming 80, where the generated gas 107 is reformed. Then, the generated gas 107 is supplied to an apparatus for processing heat recovery 50, where heat is recovered from the generated gas 107 to lower the temperature of the generated gas 107. The generated gas 107 is then supplied to an apparatus for processing gas cleaning and dust removal 75. In the apparatus for processing gas cleaning and dust removal 75, water is ejected to the generated gas 107 to clean the generated gas 107 and drainage 76, and ash 77 is removed. The generated gas 107 which has been cleaned is supplied to an apparatus for processing gas refining 78 to generate a product gas 108.

The fluidized bed 91b of the gasifier chamber 91 and a fluidized bed 92b of the combustion chamber 92 communicate with each other below a lower end of a partition wall 94. Thus, a bed material and char are moved from the fluidized bed 91b of the gasifier chamber 91 to the combustion chamber 92. The char is combusted in the combustion chamber 92 to generate a combustion gas 104. The combustion gas 104 is supplied to an apparatus for processing heat recovery 50, where heat is recovered from the combustion gas 104 to lower the temperature of the combustion gas 104. The combustion gas 104 is then supplied to an apparatus for processing dust removal 54 to remove fly ash 55. Thereafter, the combustion gas 104 is supplied to an apparatus for processing dechlorination 56 to dechlorinate the combustion gas 104 and an apparatus for processing denitration 57 to denitrate the combustion gas 104 and then released as an exhaust gas 106 to an atmosphere through a chimney (not shown).

An incombustible material 105 in the combustible material 102 is discharged from a bottom of the fluidized bed 92b of the combustion chamber 92 together with a bed material 101 into an apparatus for processing incombustible extracted material 51. In the apparatus for processing incombustible extracted material 51, the incombustible material 105 is separated from the bed material 101. The bed material 101 is supplied through the bed material supply port 17 of the screw conveyor 10 (see FIG. 4) into the conveyor casing 11. As in the cases of FIGS. 8 through 11, the bed material 101 from the fluidized bed 91b also flows into the conveyor casing 11. Thus, the conveyor casing 11 of the screw conveyor 10 is filled with a bed material 101. Accordingly, by high material sealing effects caused by mixture of the bed material 101 and the combustible material 102, external air is prevented from leaking through the screw conveyor 10 into the gasifier chamber 91, and the generated gas 107 generated in the gasifier chamber 91 is prevented from leaking out of the gasifier chamber 91 through the screw conveyor 10.

When the combustible material 102 and the high-temperature bed material 101 are brought into contact with each other in the conveyor casing 11 of the screw conveyor 10, moisture in the combustible material 102 is evaporated and combustible material 102 is pyrolyzed. Therefore, steam (water vapor) and pyrolysis gas 103 is generated. A portion of the steam (water vapor) and pyrolysis gas 103 flows through the raw material supply port 93 into the freeboard 91a, and the rest is extracted from the gas extracting port 17 (see FIG. 4) and supplied to the freeboard 92a of the combustion chamber 92.

A pressure of the freeboard 91a of the gasifier chamber 91 should preferably be set to be higher than that of the freeboard 92a of the combustion chamber 92. In such a case, the steam and pyrolysis gas 103 generated in the conveyor casing 11 can certainly be supplied to the combustion chamber 92 to reduce fear of explosion or poisoning. Further, since the combustion chamber 92 can be disposed near the screw conveyor 10, it is possible to prevent troubles in an introduction duct for the steam and pyrolysis gas 103.

FIG. 13 is a schematic view, showing an example of an advanced gasification and slagging combustion facility, which is a model of a gasification apparatus, having the combustible material supplying apparatus according to the invention and a gasification and slagging combustion furnace including an integrated gasifier. The advanced gasification and slagging combustion facility is a wastes treatment facility in which the integrated gasifier chamber 90 is combined with an apparatus for processing ash melting and complete combustion (ash melting chamber) 81. In the advanced gasification and slagging combustion facility, only the generated gas 107 from the gasifier chamber 91 is heated at a high temperature and it is therefore possible to reduce the size of the ash melting chamber 81 and the exhaust gas treatment facility 50, 54, 56 and 57 as compared to the traditional gasification and slagging combustion facility. In FIG. 13, like or corresponding parts are designated by the same reference numerals as in FIGS. 8 through 12 and will not be described repetitively. A combustible material 102 is supplied to the gasifier chamber 91 by the screw conveyor 10. The combustible material 102 is pyrolyzed and gasified in the fluidized bed 91b to generate a gas 107. The generated gas 107 flows through a freeboard 91a of the gasifier chamber 91 into an apparatus for processing ash melting and complete combustion 81. In the apparatus for processing ash melting and complete combustion 81, ash in the generated gas 107 is melted into slag 71, which is discharged to the exterior of the system, and simultaneously the generated gas 107 is completely combusted. The combustion gas 110 which has been completely combusted is supplied through an apparatus for processing heat recovery 50, an apparatus for processing dust removal 54, an apparatus for processing dechlorination 56, and an apparatus for processing denitration 57 and then released as an exhaust gas 106 to atmosphere.

As in the case of FIG. 12, when the combustible material 102 and the high-temperature bed material 101 are brought into contact with each other in the conveyor casing 11 of the screw conveyor 10, moisture in the combustible material 102 is evaporated and combustible material 102 is pyrolyzed. Therefore, steam (water vapor) and pyrolysis gas 103 is generated. A portion of the steam (water vapor) and pyrolysis gas 103 flows through the raw material supply port 93 into the freeboard 91a, and the rest is extracted from the gas extracting port 17 (see FIG. 4) and supplied to the freeboard 92a of the combustion chamber 92.

In the respective facilities shown in FIGS. 8 through 13, the screw conveyor 10 serving as a combustible material supplying apparatus has one screw 14 in the conveyor casing 11. However, the screw conveyor 10 is not limited to these examples. As shown in FIG. 6, the screw conveyor 10 may have two or more screws 14 disposed substantially parallel to each other. Alternatively, as shown in FIG. 7, it is possible to use a spiral conveyor 18 having a rotational shaft 12 disposed in a conveyor casing 11 and a helical vane 13 attached to an end of the rotational shaft 12. In this case, a plurality of rotational shafts 12 each having a helical vane 13 may be arranged in parallel each other in the conveyor casing 11. It is also possible to use other mechanical combustible material supplying devices. Although the bed material 101 to be supplied to the screw conveyor 10 is, as shown in those drawings, located downstream of the gas drawing port 17, it may be disposed upstream thereof as shown in FIG. 5.

Figure 14A:
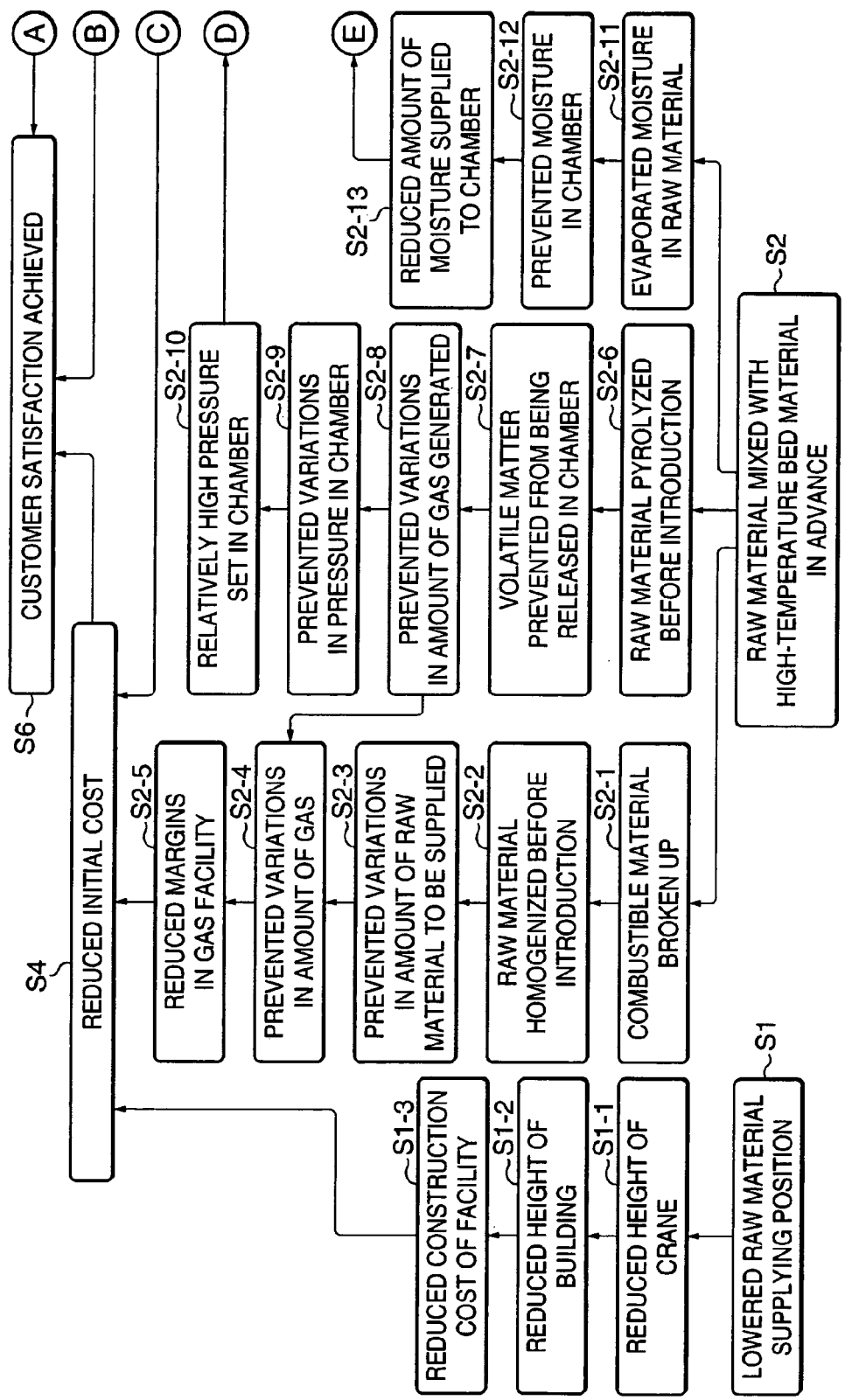
FIG. 14 is a flow chart explanatory of effects of the invention.
Figure 14B:
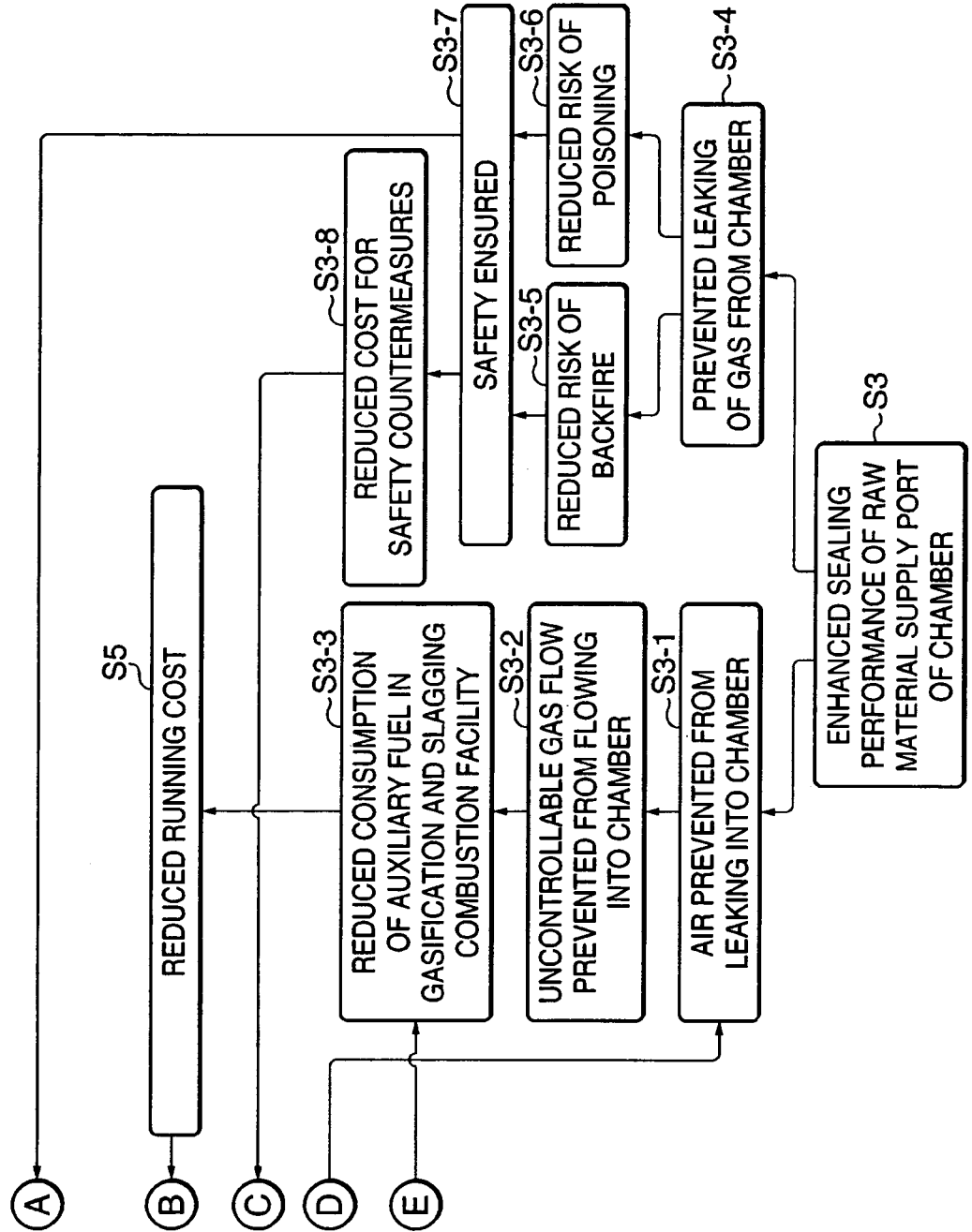

As described above, a mechanical combustible material supplying device such as the screw conveyor 10 is inclined at an angle of 20 degrees or more and 80 degrees or less with respect to the horizontal plane so that transportation of the combustible material of the screw conveyor 10 is directed upward. As a result, it is possible to lower a position from which a raw material is supplied, to mix a raw material with a high-temperature bed material in advance, and to enhance sealing performance of a raw material supply port of a furnace. Accordingly, as shown in FIG. 14, the following effects can be obtained:

(S1) Since a raw material supplying position (i.e., a position of a raw material hopper 40) can be lowered, the following effects can be obtained.
  (S1-1) It is possible to reduce the height of a crane for supplying a combustible material such as wastes into the raw material hopper 40.
  (S1-2) Accordingly, the height of a building can be reduced.
  (S1-3) As a result, construction cost of the facility can be reduced.

(S2) Since the raw material is mixed with the high-temperature bed material in advance (i.e., the combustible material and the high-temperature bed material are mixed with each other in a screw conveyor 10 in advance), the following effects can be obtained.
  (S2-1) A combustible material is broken up.
  (S2-2) A raw material is homogenized before being supplied to a chamber,
  (S2-3) It is possible to prevent variations in the amount of raw material to be supplied,
  (S2-4) Therefore, it is possible to prevent variations in the amount of gas.
  (S2-5) Margins in a gas facility can be reduced,
  (S2-6) The combustible material is pyrolyzed before being supplied into a chamber. Specifically, since the combustible material is brought into contact with the high-temperature bed material before being supplied into the chamber, the combustible material is pyrolyzed and volatile matter is obtained.
  (S2-7) Accordingly, volatile matter is prevented from being released from the combustible material in the chamber.
  (S2-8) Thus, it is possible to prevent variations in the amount of gas generated, as with (S2-4),
  (S2-9) Therefore, it is possible to prevent variations in pressure in the chamber,
  (S2-10) Accordingly, the chamber can have a relatively high pressure therein. Thus, it is possible to prevent air from leaking out of the chamber, as described later in (S3-1),
  (S2-11) Moisture in the raw material is evaporated. Specifically, since the combustible material is brought into contact with the high-temperature bed material before the combustible material is supplied into the chamber, moisture in the raw material is evaporated.

(S2-12) Thus, it is possible to prevent the evaporation of moisture in the chamber.

(S2-13) As a result, the amount of moisture supplied to the chamber can be reduced. Accordingly, in a case of a gasification and slagging combustion furnace, it is possible to reduce consumption of auxiliary fuel, as described later in (S3-3).

(S3) Since sealing performance of a raw material supply port of a chamber can be enhanced (i.e., a conveyor casing 11 of a screw conveyor 10 is filled with a bed material to enhance material sealing effects), the following effects can be obtained.

(S3-1) It is possible to prevent air from leaking into the chamber.

(S3-2) Thus, it is possible to prevent uncontrollable gas flow from flowing into the chamber.

(S3-3) Therefore, in a case of a gasification and slagging combustion chamber, consumption of auxiliary fuel can be reduced, (S3-4) It is possible to prevent leaking of a gas from the chamber, (S3-5) Therefore, it is possible to reduce risk of backfire, (S3-6) Simultaneously, it is possible to reduce risk of poisoning, (S3-7) As a result, safety can be ensured, (S3-8) Thus, cost for security countermeasures can be reduced.

(S4) Initial cost can be reduced because of reduction of construction cost (S1-3), reduction of margins in the gas facility (S2-5), and reduction of cost for security countermeasures (S3-8), (S5) Running cost can be reduced because of reduction of consumption of auxiliary fuel in a case of a gasification and slagging combustion furnace (S3-3), (S6) On the whole, it is possible to achieve customer satisfaction, Here, as a first embodiment according to the invention, a combustible material supplying apparatus for supplying a combustible material to the upper portion of a fluidized bed of a fluidized-bed gasifier chamber or combustion chamber may be characterized in that means for mechanically supplying a raw material with transportation of the combustible material directed upward, at an angle not smaller than a predetermined angle with respect to the horizontal plane.

Since, as described above, the combustible material supplying apparatus is a means for mechanically supplying a raw material with transportation of the combustible material directed upward, at an angle not smaller than a predetermined angle with respect to the horizontal plane, the material supplying position can be lowered. For example, the height of a building in which the facility is installed can be reduced by a lowered position of the material supplying means such as a crane for carrying combustible materials such as wastes.

Further, as a second embodiment of the invention, the combustible material supplying apparatus of the first embodiment according to the invention may comprise a conveyor having a helical vane for rotation to supply the combustible material as means for mechanically supplying a raw material.

Since, as described above, the means for mechanically supplying a raw material is a so called screw conveyor or spiral conveyor in which a helical vane is rotated, a combustible raw material is forced upward and supplied. It is therefore possible to achieve high material sealing effects especially by filling the conveyor casing with a bed material to promote crushing of a raw material, which prevents both the leakage of air into the chamber and the leakage of a gas out of the chamber.

Further, as a third embodiment of the invention, the combustible material supplying apparatus of the second embodiment according to the invention may be characterized in that the conveyor has two or more helical vanes generally disposed in parallel.

Since, as described above, the conveyor has two or more helical vanes generally disposed in parallel, crushing of a raw material is especially promoted by filling the conveyor casing with a bed material.

Further, a fourth embodiment of the invention concerns a facility for gasifying a combustible material having a fluidized-bed gasifier chamber and a combustible material supplying means for supplying a combustible material to the gasifier chamber, and gasifying the combustible material supplied to the upper portion of the fluidized bed by the combustible material supplying means. The combustible material supplying means is a means for mechanically supplying a raw material which is inclined, with transportation of the combustible material directed upward, at an angle not smaller than a predetermined angle with respect to the horizontal plane. A supplying means is provided for filling the means for mechanically supplying a raw material with a bed material to form a fluidized bed of the fluidized-bed gasifier chamber.

Since, as described above, the combustible material supplying means is a means for mechanically supplying a raw material which is disposed to be inclined, with transportation of the combustible material directed upward, at an angle not smaller than a predetermined angle, and a bed material supplying means is provided, it is possible to promote crushing of a raw material and suppress the variation of the amount of the raw material to be supplied, while achieving high material sealing effects when the bed material supplying means is filled with the bed material having a high temperature through the bed material supplying means.

Further, a fifth embodiment of the invention concerns a facility for gasifying a combustible material having a fluidized-bed gasifier chamber and a combustible material supplying means for supplying a combustible material to the gasifier chamber and for gasifying the combustible material supplied to the upper portion of the fluidized bed. The combustible material supplying means is a means for mechanically supplying a raw material which is inclined, with transportation of combustible material directed upward, at an angle not smaller than a predetermined angle with respect to the horizontal plane. A bed material supplying means is provided for filling the means for mechanically supplying a raw material with a bed material to form a fluidized bed of the fluidized bed gasifier chamber. A bypass means is provided which bypasses the gasifier chamber and leads the gas generated by the contact of the combustible material with the bed material in the means for mechanically supplying a raw material, to the downstream of the gasifier chamber.

Since, as described above, there is provided a bypass means which bypasses the gasifier chamber and leads the gas generated from the combustible material in the means for mechanically supplying a raw material, to the downstream of the gasifier chamber, it is possible to suppress the variation of the amount of the gas generated in the gasifier chamber and also possible to securely treat the gas generated in the means for mechanically supplying a raw material with no leak of the gas outside, in addition to the effects of the fourth embodiment of the invention.

Further, a sixth embodiment of the invention concerns a combustible material gasification method of supplying a combustible material to a fluidized-bed gasifier chamber and gasifying the combustible material. The combustible material is supplied through a means for mechanically supplying a raw material which is inclined, with transportation of the combustible material directed upward, at an angle not smaller than a predetermined angle with respect to the horizontal plane. The means for mechanically supplying a raw material is filled with a bed material to form a fluidized bed of the fluidized-bed gasifier chamber therein. The combustible material is supplied to the fluidized-bed gasifier chamber while enhancing material sealing effects of a material supplying system; and the combustible material is gasified.

Since, as described above, the combustible material is supplied through a means for mechanically supplying a raw material which is inclined, with transportation of the combustible material directed upward, at an angle not smaller than a predetermined angle with respect to the horizontal plane, and the means for mechanically supplying a raw material is filled with a bed material, it is possible to promote crushing of a raw material, to suppress the variation of the amount of a raw material to be supplied and to achieve high material sealing effects during gasification.

Further, a seventh embodiment of the invention concerns a combustible material gasification method of supplying a combustible material to a fluidized-bed gasifier chamber and gasifying the combustible material. The combustible material is supplied through means for mechanically supplying a raw material which is inclined, with transportation of the combustible material directed upward, at an angle not smaller than a predetermined angle with respect to the horizontal plane. The means for mechanically supplying a raw material is filled with a bed material to form a fluidized bed of the fluidized-bed gasifier chamber therein. The combustible material is supplied to the fluidized-bed gasifier chamber while enhancing material sealing effects of a material supplying system. The combustible material is positively contacted with the bed material in the means for mechanically supplying a raw material to evaporate the moisture and volatile matter from the combustible material. The combustible material, from which the moisture and volatile matter was removed, is supplied to the fluidized-bed gasifier chamber; and the combustible material is gasified.

Since, as described above, the combustible material and the bed material having a high temperature are positively placed in contact, moisture and volatile matter is vaporized from the combustible material, and the combustible material from which moisture and volatile matter was removed is supplied to the fluidized-bed gasifier chamber, it is possible to suppress the variation of the amount of the gas generated in the gasifier chamber and also suppress the variation of the amount of the moisture therein.

Further, an eighth embodiment of the invention concerns a combustible material gasification method of supplying a combustible material to a fluidized-bed gasifier chamber and gasifying the combustible material. The combustible material is supplied through means for mechanically supplying a raw material which is inclined, with transportation of the combustible material directed upward, at an angle not smaller than a predetermined angle with respect to the horizontal plane. The means for mechanically supplying a raw material is filled with a bed material to form a fluidized bed of the fluidized-bed gasifier chamber therein. The combustible material is supplied to the fluidized-bed gasifier chamber while enhancing material sealing effects of a material supplying system. The combustible material is positively contacted with the bed material in the means for mechanically supplying a raw material to evaporate the moisture and volatile matter from the combustible material. The generated steam and volatile matter bypassing the fluidized-bed chamber is led to the downstream thereof. The combustible material, from which the moisture and volatile matter was removed, is supplied to the fluidized-bed gasifier chamber; and the combustible material is gasified.

Since, as described above, the steam and volatile matter generated in the means for mechanically supplying a raw material bypass the gasifier chamber and flow into the downstream thereof, it is possible to securely treat the gas generated in the means for mechanically supplying a raw material with no leakage of the gas outside, in addition to the effects of the seventh embodiment of the invention.

Further, a ninth embodiment of the invention concerns a combustible material supplying apparatus for supplying a combustible material together with incombustible particles. A means for mechanically supplying a raw material is inclined, with transportation of the combustible material directed upward, at an angle not smaller than a predetermined angle with respect to the horizontal plane.

Since, as described above, the combustible material is supplied together with incombustible particles by the means for mechanically supplying a raw material which is inclined, with transportation of the combustible material directed upward, at an angle not smaller than a predetermined angle with respect to the horizontal plane, a mixture of the combustible material and the incombustible particles is transported, resulting in a combustible material supplying apparatus having high material sealing effects.

According to the first embodiment, the combustible material supplying apparatus is the means for mechanically supplying a raw material and disposed to be inclined, with transportation of the combustible material directed upward, at an angle not smaller than a predetermined angle with respect to the horizontal plane. The raw material supply position can be lowered and it is therefore possible to provide a combustible material supplying apparatus which can allow a reduction in the height of a building in which the facility is installed and which can allow the total construction cost of the entire facility to be reduced.

According to the second embodiment, the means for mechanically supplying a raw material is so called a screw conveyor or spiral conveyor in which a helical vane is rotated, and a combustible raw material is forced upward and supplied. It is therefore possible to provide a combustible material supplying apparatus having high safety and high material sealing effects especially by filling the conveyor casing with a bed material to promote crushing of a raw material, which prevents both the leakage of air into the chamber and the leakage of a gas out of the chamber, in addition to the effects of the first embodiment.

According to the third embodiment, the conveyor has two or more helical vanes generally disposed in parallel. It is therefore possible to provide a combustible material supplying apparatus which promotes crushing of a raw material especially by filling the conveyor casing with a bed material and which suppresses the variation of the amount of the combustible material to be supplied, in addition to the effects of the first and second embodiments.

According to the fourth embodiment, the combustible material supplying means is a means for mechanically supplying a raw material which is disposed to be inclined, with its downstream end directed upward, at an angle not smaller than a predetermined angle, and a bed material supplying means is provided. It is therefore possible to provide a facility for gasifying a combustible material having high safety and high material sealing effects, which promotes crushing of a raw material and suppresses the variation of the amount of the raw material to be supplied, while achieving high material sealing effects when the bed material supplying means is filled with the bed material having a high temperature through the bed material supplying means.

According to the fifth embodiment, there is provided a bypass means which bypasses the gasifier chamber and leads the gas generated from the combustible material in the means for mechanically supplying a raw material, to the downstream of the gasifier chamber. It is therefore possible to provide a facility for gasifying a combustible material having high safety and high material sealing effects, which suppresses the variation of the amount of the gas generated in the gasifier chamber and also securely treats the gas generated in the means for mechanically supplying a raw material with no leakage of the gas outside, in addition to the effects of the fourth embodiment of the invention.

According to the sixth embodiment, the combustible material is supplied through means for mechanically supplying a raw material which is inclined, with transportation of the combustible material directed upward, at an angle not smaller than a predetermined angle with respect to the horizontal plane and the means for mechanically supplying a raw material is filled with a bed material. It is therefore possible to provide a method of gasifying a combustible material, which promotes crushing of a raw material, suppresses the variation of the amount of a raw material to be supplied and achieves high material sealing effects during gasification.

According to the seventh embodiment, the combustible material and the bed material having a high temperature are positively contacted in the means for mechanically supplying a raw material, moisture and volatile matter is vaporized from the combustible material, and the combustible material, from which moisture and volatile matter was removed is supplied to the fluidized-bed gasifier chamber. It is therefore possible to provide a method of gasifying a combustible material, which suppresses the variation of the amount of the gas generated in the gasifier chamber and also suppresses the amount of the moisture therein, in addition of the effects of the sixth embodiment.

According to the eighth embodiment, the steam and volatile matter generated in the means for mechanically supplying a raw material bypass the gasifier chamber and flow into the downstream thereof. Thus, it is possible to securely treat the gas generated in the means for mechanically supplying a raw material with no leakage of the gas outside, in addition to the effects of the seventh embodiment of the invention.

According to the ninth embodiment, since the combustible material is supplied together with incombustible particles by means for mechanically supplying a raw material which is inclined, with transportation of the combustible material directed upward, at an angle not smaller than a predetermined angle with respect to the horizontal plane, a mixture of the combustible material and the incombustible particles is transported. It is therefore possible to provide a combustible material supplying apparatus having high material sealing effects.

It should be noted that the detailed description and specific examples are preferred embodiments of the invention, only for the purpose of the description thereof. It is apparent to the person of ordinary skill in the art to modify and change the invention in a variety of manners, within the scope and spirit of the invention. The applicant does not intend to dedicate any disclosed embodiments to the public, and to the extent any disclosed modifications or alterations may not literally fall within the scope of the claims, they are considered to be part of the invention under the doctrine of equivalents.

As is described heretofore, according to the invention, it is possible to provide a combustible material supplying apparatus, a facility for gasifying a combustible material, and a method of gasifying a combustible material, which allow increased sealing effects of the supplying system for supplying a combustible material, such as combustible wastes, to the fluidized-bed chamber, a stable supply of undefined shapes of wastes, and a reduction of construction costs.

What is claimed is:

1. A method of gasifying a combustible material in a chamber of a fluidized bed, comprising:
   storing the combustible material in a hopper;
   supplying the combustible material upwardly from the hopper to the chamber of the fluidized bed using a mechanical supplying device;
   filling an inside of the mechanical supplying device with a medium of the same type which forms the fluidized bed to enhance a material sealing function of the mechanical supplying device; and
   gasifying the combustible material supplied to the chamber of the fluidized bed.

2. The method of claim 1, wherein said filling the inside of the mechanical supplying device with the medium comprises supplying the medium to the mechanical supplying device through a supply port connected to and communicating with the mechanical supplying device.

3. The method of claim 1, further comprising vaporizing at least one of moisture and volatile matter from the combustible material in the supplying apparatus.

4. A supplying apparatus for supplying a combustible material to a chamber of a fluidized bed, said apparatus comprising:
   a hopper for storing a combustible material;
   a mechanical supplying device for transferring a combustible material from said hopper to the chamber of the fluidized bed, said mechanical supplying device being shaped and arranged to form a flow passage of the combustible material directed upward to the chamber; and
   a medium of the same type which forms the fluidized bed, said medium being filled inside said mechanical supplying device to prevent gas communication through said mechanical supplying device.

5. The supplying apparatus of claim 4, further comprising a supply port connected to and communicating with said mechanical supplying device to supply said medium into said mechanical supplying device through said supply port.

6. A supplying apparatus for supplying a combustible material to an upper portion of a chamber of a fluidized bed, said apparatus comprising:
   a hopper for storing a combustible material;
   a mechanical supplying device for transferring the combustible material from said hopper to the upper portion of the chamber, said mechanical supplying device being shaped and arranged to form a flow passage of the combustible material directed upward to the upper portion, said flow passage being inclined at an angle in a range of 20 degrees to 80 degrees with respect to a horizontal plane; and a medium supplying device for supplying a medium of the same type which forms the fluidized bed to said mechanical supplying device, an inside of said mechanical supplying device being filled with said medium to prevent gas communication through said mechanical supplying device.

7. The supplying apparatus of claim 6, wherein said medium supplying device being shaped and arranged to form a flow passage of said medium different from said flow passage of the combustible material.

8. The supplying apparatus of claim 6, wherein said mechanical supplying device comprises a conveyor having a rotatable helical vane operable to rotate so as to move the combustible material toward the chamber.

9. The supplying apparatus of claim 8, wherein said medium supplying device being shaped and arranged to form a flow passage of said medium different from said flow passage of the combustible material.

10. The supplying apparatus of claim 6, wherein said mechanical supplying device comprises a screw conveyor.

11. A gasification apparatus for gasifying a combustible material, comprising:
   a supplying apparatus including:
      a hopper for storing a combustible material;
      a mechanical supplying device for transferring the combustible material from said hopper to the upper portion of the chamber, said mechanical supplying device being shaped and arranged to form a flow passage of the combustible material directed upward to the upper portion, said flow passage being inclined at an angle in a range of 20 degrees to 80 degrees with respect to a horizontal plane; and
      a medium supplying device for supplying a medium to said mechanical supplying device, an inside of said mechanical supplying device being filled with said medium to prevent gas communication;
   a fluidized-bed gasifier chamber for gasifying the combustible material supplied by said supplying apparatus, said supplying apparatus being arranged to transfer the combustible material to an upper portion of said gasifier chamber; and
   a bypass line connected to said mechanical supplying device of said supplying apparatus and arranged to lead a gas generated from the combustible material within said supplying apparatus so as to bypass said gasifier chamber.

12. A gasification apparatus for gasifying a combustible material, comprising:
   a supplying apparatus including:
      a hopper for storing a combustible material;
      a mechanical supplying device for transferring the combustible material from said hopper to the upper portion of the chamber said mechanical supplying device being shaped and arranged to form a flow passage of the combustible material directed upward to the upper portion, said flow passage being inclined at an angle in a range of 20 degrees to 80 degrees with respect to a horizontal plane; and
      a medium supplying device for supplying a medium to said mechanical supplying device, an inside of said mechanical supplying device being filled with said medium to prevent gas communication; and
      a bypass line connected to said mechanical supplying device of said supplying apparatus and arranged to lead at least one of moisture and volatile matter vaporized from the combustible material in said supplying apparatus to a point downstream of said gasifier chamber so as to bypass said gasifier chamber.

13. A gasification apparatus for gasifying a combustible material, comprising:
   a supplying apparatus including:
      a hopper for storing a combustible material;
      a mechanical supplying device for transferring the combustible material from said hopper to the upper portion of the chamber, said mechanical supplying device being shaped and arranged to form a flow passage of the combustible material directed upward to the upper portion, said flow passage being inclined at an angle in a range of 20 degrees to 80 degrees with respect to a horizontal plane; and
      a medium supplying device for supplying a medium to said mechanical supplying device, an inside of said mechanical supplying device being filled with said medium to prevent gas communication;
   a fluidized-bed gasifier chamber for gasifying the combustible material supplied by said supplying apparatus, said supplying apparatus being arranged to transfer the combustible material to an upper portion of said gasifier chamber;
   a bypass line connected to said mechanical supplying device of said supplying apparatus and arranged to lead a gas generated from the combustible material within said supplying apparatus so as to bypass said gasifier chamber; and
   wherein said mechanical supplying device comprises a conveyor having a rotatable helical vane operable to rotate so as to move the combustible material toward the chamber.

14. A gasification apparatus for gasifying a combustible material, comprising:
   a fluidized-bed gasifier chamber for gasifying the combustible material;
   a supplying apparatus for supplying the combustible material to an upper portion of said gasifier chamber, said supplying apparatus including:
      a hopper for storing the combustible material; and
      a mechanical supplying device for transferring the combustible material from said hopper to the upper portion of the chamber, said mechanical supplying device being shaped and arranged to form a flow passage of the combustible material directed upward to the upper portion, said flow passage being inclined at an angle in a range of 20 degrees to 80 degrees with respect to a horizontal plane, said mechanical supplying device including:
         a conveyor having a rotatable helical vane operable to rotate so as to move the combustible material toward said gasifier chamber; and
         a conveyor casing containing said helical vane, said conveyor casing having a projection on an inner surface thereof for maintaining efficient movement of the combustible material through said mechanical supplying device;
   wherein said supplying apparatus is operable to vaporize at least one of moisture and volatile matter from the combustible material transferred therein; and
   a bypass line connected to said mechanical supplying device of said supplying apparatus and arranged to lead one of moisture and volatile matter vaporized from the combustible material in said supplying apparatus to a point downstream of said gasifier chamber so as to bypass said gasifier chamber.

15. A gasification apparatus for gasifying a combustible material, comprising:
- a fluidized-bed gasifier chamber for gasifying the combustible material;
- a supplying apparatus for supplying the combustible material to an upper portion of said gasifier chamber, said supplying apparatus including:
  - a hopper for storing the combustible material; and
  - a mechanical supplying device for transferring the combustible material from said hopper to the upper portion of the chamber, said mechanical supplying device being shaped and arranged to form a flow passage of the combustible material directed upward to the upper portion, said flow passage being inclined at an angle in a range of 20 degrees to 80 degrees with respect to a horizontal plane, said mechanical supplying device including:
    - a conveyor having a rotatable helical vane operable to rotate so as to move the combustible material toward said gasifier chamber; and
    - a conveyor casing containing said helical vane, said conveyor casing having a projection on an inner surface thereof for maintaining efficient movement of the combustible material through said mechanical supplying device; and
  - a supply port connected to and communicating with said mechanical supplying device to supply a medium of the same type which forms a fluidized bed of said gasifier chamber into said mechanical supplying device through said supply port.

16. The gasification apparatus of claim 15, wherein an inside of said mechanical supplying device is filled with said medium to prevent gas communication through said mechanical supplying device.

17. The gasification apparatus of claim 15, further comprising a bypass line connected to said mechanical supplying device of said supplying apparatus and arranged to lead one of moisture and volatile matter vaporized from the combustible material in said supplying apparatus to a point downstream of said gasifier chamber so as to bypass said gasifier chamber.

* * * * *